United States Patent
Adachi

(10) Patent No.: US 9,300,823 B1
(45) Date of Patent: Mar. 29, 2016

(54) MAINTENANCE NECESSITY ESTIMATION APPARATUS AND NON-TRANSITORY COMPUTER READABLE MEDIUM

(71) Applicant: FUJI XEROX CO., LTD., Tokyo (JP)

(72) Inventor: Koji Adachi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/700,262

(22) Filed: Apr. 30, 2015

(30) Foreign Application Priority Data

Oct. 16, 2014 (JP) .................................. 2014-212056

(51) Int. Cl.
*G03G 15/00* (2006.01)
*H04N 1/00* (2006.01)

(52) U.S. Cl.
CPC ....... *H04N 1/00344* (2013.01); *H04N 1/00023* (2013.01); *H04N 1/00037* (2013.01); *H04N 1/00244* (2013.01); *H04N 1/00323* (2013.01)

(58) Field of Classification Search
USPC ...................................... 399/9, 10, 14, 16–23
See application file for complete search history.

(56) References Cited

U.S. PATENT DOCUMENTS

| | | | | |
|---|---|---|---|---|
| 7,203,431 B2 * | 4/2007 | Shoji | ................... | G06F 11/0754 |
| | | | | 399/9 |
| 7,457,550 B2 * | 11/2008 | Shoji | ...................... | G03G 15/55 |
| | | | | 399/9 |
| 8,200,101 B2 * | 6/2012 | Ue | ...................... | G03G 15/55 |
| | | | | 399/9 |
| 2007/0258723 A1 * | 11/2007 | Nakazato | ............... | G03G 15/55 |
| | | | | 399/9 |

FOREIGN PATENT DOCUMENTS

| | | |
|---|---|---|
| JP | 2-144348 A | 6/1990 |
| JP | 2003-176050 A | 6/2003 |
| JP | 2005-206307 A | 8/2005 |

* cited by examiner

*Primary Examiner* — Hoan Tran
(74) *Attorney, Agent, or Firm* — Sughrue Mion, PLLC

(57) ABSTRACT

Provided is a maintenance necessity estimation apparatus including a storage unit that stores in advance an estimation model and estimates first necessity information indicating a degree of necessity of a maintenance work with respect to the drive member in accordance with the output information, an acquisition section that acquires a second transit time and second feature information of an image processing apparatus which is an estimation target of second necessity information, and an estimation section that estimates necessity information of the image processing apparatus which is the estimation target using, as input information, a value corresponding to the second transit time and the second feature information acquired by the acquisition unit, using the estimation model stored in the storage unit.

20 Claims, 25 Drawing Sheets

FIG.7

| ACQUISITION DATE AND TIME | APPARATUS INFORMATION | | | PAPER FEATURE INFORMATION | FIRST TRANSIT TIME | | |
|---|---|---|---|---|---|---|---|
| | APPARATUS TYPE INFORMATION | APPARATUS ID | CONTAINER INFORMATION | PAPER TYPE | SENSOR S1(ms) | SENSOR S2(ms) | ... |
| 5/10/2013 10:09 | A01 | 10001 | CONTAINER 1 | PLAIN PAPER | 650 | 815 | ... |
| 5/10/2013 10:09 | A01 | 10001 | CONTAINER 1 | PLAIN PAPER | 647 | 809 | ... |
| 5/10/2013 10:09 | A01 | 10001 | CONTAINER 1 | PLAIN PAPER | 652 | 813 | ... |
| 5/10/2013 10:09 | A01 | 10001 | CONTAINER 1 | PLAIN PAPER | 651 | 810 | ... |
| 5/10/2013 10:09 | A01 | 10001 | CONTAINER 1 | PLAIN PAPER | 646 | 809 | ... |
| 5/10/2013 10:09 | A01 | 10001 | CONTAINER 1 | PLAIN PAPER | 650 | 813 | ... |
| 5/10/2013 10:09 | A01 | 10001 | CONTAINER 1 | PLAIN PAPER | 649 | 812 | ... |
| 5/10/2013 10:09 | A01 | 10001 | CONTAINER 1 | PLAIN PAPER | 645 | 807 | ... |
| ... | ... | ... | ... | ... | ... | ... | ... |

| ACQUISITION DATE AND TIME | PAPER FEATURE INFORMATION | TRANSPORT STATE FEATURE VALUE | | | | |
|---|---|---|---|---|---|---|
| | PAPER TYPE | SENSOR S1 FIRST TRANSIT TIME | | SENSOR S1-SENSOR S2 SECOND TRANSIT TIME | | ⋮ |
| | | AVERAGE VALUE [ms] | √VARIANCE VALUE | AVERAGE VALUE [ms] | √VARIANCE VALUE | ⋮ |
| 5/7/2013 8:10 | PLAIN PAPER | 647.93 | 2.435 | 154.6 | 1.497 | ⋮ |
| 5/7/2013 16:45 | COATED PAPER | 641.27 | 2.567 | 153.8 | 1.566 | ⋮ |
| 5/8/2013 14:12 | COATED PAPER | 639.89 | 2.832 | 158.3 | 1.953 | ⋮ |
| 5/9/2013 11:12 | PLAIN PAPER | 650.87 | 5.287 | 156.6 | 3.959 | ⋮ |
| 5/9/2013 16:41 | PLAIN PAPER | 646.61 | 7.336 | 160.4 | 2.693 | ⋮ |
| 5/14/2013 9:50 | COATED PAPER | 648.39 | 4.562 | 156.9 | 2.224 | ⋮ |
| 5/14/2013 13:22 | COATED PAPER | 646.33 | 3.923 | 157.4 | 1.885 | ⋮ |
| 5/14/2013 15:33 | COATED PAPER | 643.21 | 2.891 | 157.2 | 3.213 | ⋮ |
| ⋯ | ⋯ | ⋯ | ⋯ | ⋯ | ⋯ | ⋯ |

| ACQUISITION DATE AND TIME | APPARATUS INFORMATION | | FAULT TYPE INFORMATION | MAINTENANCE WORK INFORMATION | | | |
|---|---|---|---|---|---|---|---|
| | APPARATUS TYPE INFORMATION | APPARATUS ID | | MAINTENANCE TARGET ROLL | SENSOR PAIR | MAINTENANCE WORK CONTENT | |
| 5/10/2013 10:09 | A01 | 10001 | MISFEED | R01 | SENSORS S1 AND S2 | CLEANING | |
| 5/21/2013 13:39 | A01 | 10002 | MULTI FEED | R05 | SENSORS S3 AND S4 | EXCHANGE | |
| 6/11/2013 15:22 | A01 | 10003 | MISFEED | R02 | SENSORS S1 AND S2 | CLEANING | |
| ... | ... | ... | ... | ... | ... | ... | |

| | PAPER FEATURE INFORMATION | TRANSPORT STATE FEATURE VALUE | | |
|---|---|---|---|---|
| | | SENSOR S1 FIRST TRANSIT TIME | | |
| ACQUISITION DATE AND TIME | PAPER TYPE | AVERAGE VALUE [ms] | AVERAGE VALUE CHANGE RATE | $\sqrt{\text{VARIANCE VALUE}}$ | CHANGE RATE OF $\sqrt{\text{VARIANCE VALUE}}$ |
| 5/7/2013 8:10 | PLAIN PAPER | 647.93 | 0.0817 | 2.435 | 0.1346 |
| 5/7/2013 16:45 | COATED PAPER | 641.27 | 0.0932 | 2.567 | 0.1743 |
| 5/8/2013 14:12 | COATED PAPER | 639.89 | 0.1122 | 2.832 | 0.1282 |
| 5/9/2013 11:12 | PLAIN PAPER | 650.87 | 0.2423 | 5.287 | -0.1042 |
| 5/9/2013 16:41 | PLAIN PAPER | 646.61 | 0.2317 | 7.336 | -0.8233 |
| 5/14/2013 9:50 | COATED PAPER | 648.39 | 0.2287 | 4.562 | -0.5632 |
| 5/14/2013 13:22 | COATED PAPER | 646.33 | 0.1955 | 3.923 | -0.2349 |
| 5/14/2013 15:33 | COATED PAPER | 643.21 | 0.1301 | 2.891 | -0.3391 |
| ... | ... | ... | ... | ... | ... |

| ACQUISITION DATE AND TIME | PAPER FEATURE INFORMATION | TRANSPORT STATE FEATURE VALUE ||||  |
|---|---|---|---|---|---|---|
| | | SENSOR S1-SENSOR S2 SECOND TRANSIT TIME |||| ... |
| | PAPER TYPE | AVERAGE VALUE [ms] | AVERAGE VALUE CHANGE RATE | √VARIANCE VALUE | CHANGE RATE OF √VARIANCE VALUE | ... |
| 5/7/2013 8:10 | PLAIN PAPER | 154.6 | -0.0088 | 1.497 | 0.0048 | ... |
| 5/7/2013 16:45 | COATED PAPER | 153.8 | -0.0072 | 1.566 | 0.0088 | ... |
| 5/8/2013 14:12 | COATED PAPER | 158.3 | -0.0064 | 1.953 | 0.0043 | ... |
| 5/9/2013 11:12 | PLAIN PAPER | 156.6 | -0.0054 | 3.959 | -0.0218 | ... |
| 5/9/2013 16:41 | PLAIN PAPER | 160.4 | 0.0072 | 2.693 | -0.0257 | ... |
| 5/14/2013 9:50 | COATED PAPER | 156.9 | 0.0087 | 2.224 | -0.0193 | ... |
| 5/14/2013 13:22 | COATED PAPER | 157.4 | -0.0029 | 1.885 | -0.0132 | ... |
| 5/14/2013 15:33 | COATED PAPER | 157.2 | 0.0045 | 3.213 | -0.0098 | ... |
| ... | ... | ... | ... | ... | ... | ... |

| ACQUISITION DATE AND TIME | APPARATUS INFORMATION | | PAPER FEATURE INFORMATION | | | FIRST TRANSIT TIME | |
|---|---|---|---|---|---|---|---|
| | APPARATUS TYPE INFORMATION | APPARATUS ID | CONTAINER INFORMATION | PAPER TYPE | GRAMMAGE [g/m$^2$] | SIZE [mm$^2$] | SENSOR S1 (ms) | SENSOR S2 (ms) |
| 5/10/2013 10:09 | A01 | 10001 | CONTAINER 1 | PLAIN PAPER | 81 | 14167000 | 650 | 815 | ... |
| 5/10/2013 10:09 | A01 | 10001 | CONTAINER 1 | PLAIN PAPER | 81 | 14167000 | 647 | 809 | ... |
| 5/10/2013 10:09 | A01 | 10001 | CONTAINER 1 | PLAIN PAPER | 81 | 14167000 | 652 | 813 | ... |
| 5/10/2013 10:09 | A01 | 10001 | CONTAINER 1 | PLAIN PAPER | 81 | 14167000 | 651 | 810 | ... |
| 5/10/2013 10:09 | A01 | 10001 | CONTAINER 1 | PLAIN PAPER | 81 | 14167000 | 646 | 809 | ... |
| 5/10/2013 10:09 | A01 | 10001 | CONTAINER 1 | PLAIN PAPER | 81 | 14167000 | 650 | 813 | ... |
| 5/10/2013 10:09 | A01 | 10001 | CONTAINER 1 | PLAIN PAPER | 81 | 14167000 | 649 | 812 | ... |
| 5/10/2013 10:09 | A01 | 10001 | CONTAINER 1 | PLAIN PAPER | 81 | 14167000 | 645 | 807 | ... |
| ... | ... | ... | ... | ... | ... | ... | ... | ... | ... |

314

MAINTENANCE NECESSITY ESTIMATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-212056 filed on Oct. 16, 2014.

BACKGROUND

Technical Field

Exemplary embodiments of the present invention relate to a maintenance necessity estimation apparatus and a non-transitory computer readable medium.

SUMMARY

According to an aspect of the invention, there is provided a maintenance necessity estimation apparatus including:

a storage unit that stores in advance an estimation model that is constructed in advance using a value corresponding to a first transit time from a predetermined time point in each image processing apparatus that includes a transport path on which paper is transported and a drive member that is disposed along the transport path and is operated to transport the paper to a time point when the paper passes through a predetermined position on the transport path, and using first feature information indicating a feature of the paper, as input information, which are acquired from the plural image processing apparatuses, and using, as output information, information corresponding to transport fault information relating to a transport fault of the paper due to the drive member, which is acquired from the plural image processing apparatuses, and estimates first necessity information indicating a degree of necessity of a maintenance work with respect to the drive member in accordance with the output information;

an acquisition section that acquires a second transit time and second feature information of an image processing apparatus which is an estimation target of second necessity information; and an estimation section that estimates necessity information of the image processing apparatus which is the estimation target using, as input information, a value corresponding to the second transit time and the second feature information acquired by the acquisition unit, using the estimation model stored in the storage unit.

BRIEF DESCRIPTION OF THE DRAWINGS

Exemplary embodiments of the present invention will be described in detail based on the following figures, wherein:

FIG. 7 is a schematic diagram illustrating an example of paper transport information according to the exemplary embodiment;

FIG. 8 is a schematic diagram illustrating an example of analysis information according to the first exemplary embodiment;

FIG. 10 is a schematic diagram illustrating an example of transport fault information according to the exemplary embodiment;

FIGS. 19A and 19B are schematic diagrams illustrating an example of analysis information according to the second exemplary embodiment;

FIG. 24 is a schematic diagram illustrating an example of paper transport information according to a modification example of each exemplary embodiment;

DETAILED DESCRIPTION

Hereinafter, exemplary embodiments of the invention will be described with reference to the accompanying drawings. Here, a case in which the exemplary embodiments of the invention are applied to a maintenance necessity estimation system in which plural image forming apparatuses and one maintenance necessity estimation apparatus are connected to each other through a communication line and the respective image forming apparatuses are generally managed by the maintenance necessity estimation apparatus will be described.

First Exemplary Embodiment

First, a configuration of a maintenance necessity estimation system 300 according to the present exemplary embodiment will be described with reference to FIG. 1.

Figure 1:
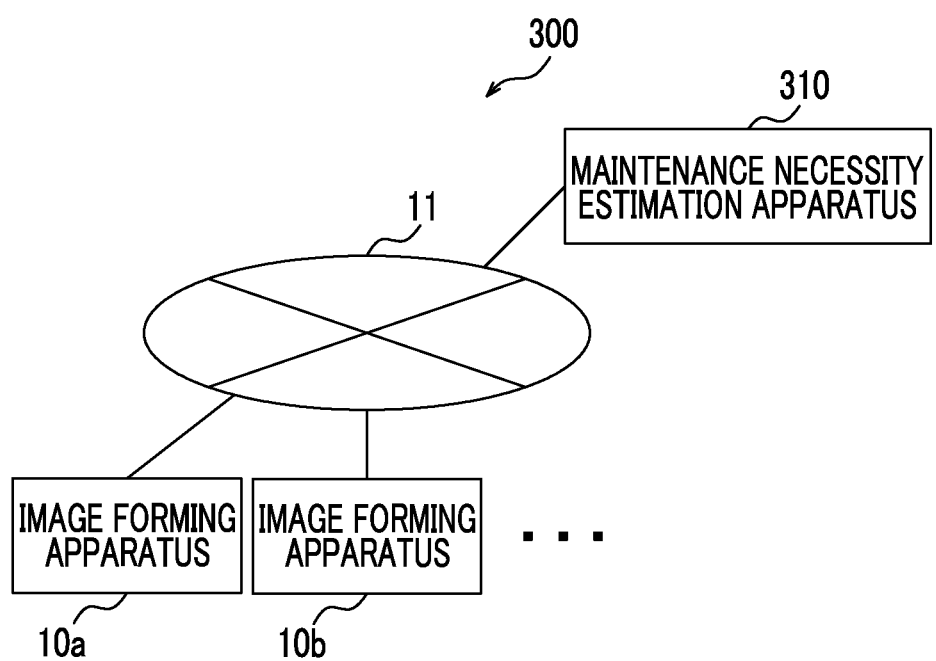
FIG. 1 is a schematic configuration diagram of a maintenance necessity estimation system according to an exemplary embodiment.

As shown in FIG. 1, the maintenance necessity estimation system 300 according to the present exemplary embodiment includes plural image forming apparatuses 10a, 10b, and so on, and a maintenance necessity estimation apparatus 310. When it is not necessary to distinguish between the image forming apparatuses 10a, 10b, and so on, letters do not follow the reference numbers.

Each image forming apparatus 10 and the maintenance necessity estimation apparatus 310 are connected to each other through a predetermined communication line 11 such as a local area network (LAN) or a wide area network (WAN). Further, each image forming apparatus 10 and the maintenance necessity estimation apparatus 310 perform transmission and reception of a variety of pieces of data through the communication line 11.

Figure 2:
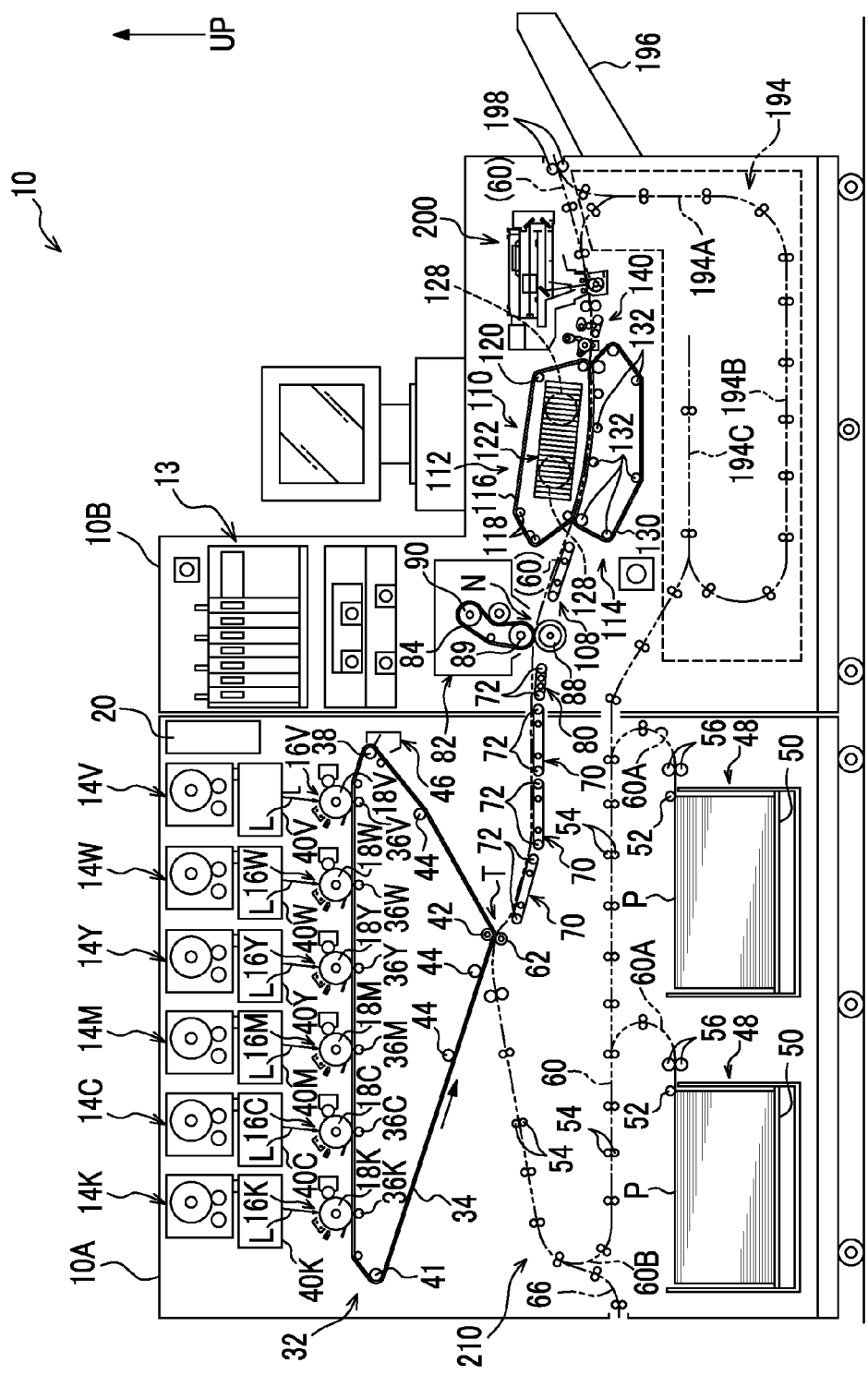
FIG. 2 is a schematic configuration diagram (sectional side view) of an image forming apparatus according to an exemplary embodiment.

Next, a configuration of the image forming apparatus 10 according to the present exemplary embodiment will be described with reference to FIG. 2. In FIG. 2, for ease of understanding, a timing sensor 57 and a multi feed sensor 59 (see FIG. 3) which will be described later are not shown.

The image forming apparatus 10 according to the present exemplary embodiment includes a first housing 10A in which a first processing unit that forms a full-color image or a black-and-white image and forms one side (left side in FIG. 2) portion in a horizontal direction is stored, as shown in FIG. 2. Further, the image forming apparatus 10 includes a second housing 10B, separably connected to the first housing 10A, in which a second processing unit that forms the other side (right side in FIG. 2) portion in the horizontal direction is stored.

In an upper part of the second housing 10B, an image signal processing unit 13 that performs image processing of image data transmitted from an external device such as a computer is provided.

On the other hand, in an upper part of the first housing 10A, toner cartridges 14V, 14W, 14Y, 14M, 14C, and 14K are exchangeably provided along the horizontal direction. Respective toners of a first special color (V), a second special color (W), yellow (Y), magenta (M), cyan (c), and black (K) are stored in the toner cartridges 14V, 14W, 14Y, 14M, 14C, and 14K.

As the first special color and the second special color, an arbitrary color is appropriately selected from colors (including a transparent color) other than yellow, magenta, cyan, and black. Hereinafter, when distinguishing between the first special color (V), the second special color (W), yellow (Y), magenta (M), cyan (C), and black (K) with respect to each part, any one of V, W, Y, M, C, and K is affixed to the corresponding number. Further, hereinafter, when not distinguishing between the first special color (V), the second special color (W), yellow (Y), magenta (M), cyan (C), and black (K) with respect to each part, V, W, Y, M, C, and K are not affixed following the numbers.

Further, on a lower side of the toner cartridges 14, six image forming units 16 corresponding to the respective color toners are provided along the horizontal direction to correspond to the respective toner cartridges 14.

An exposure device 40 (40V, 40W, 40Y, 40M, 40C, and 40K) provided in each image forming unit 16 receives the image data that is image-processed by the above-described image signal processing unit 13 from the image signal processing unit 13. Each exposure device 40 irradiates an image holding member 18 (18V, 18W, 18Y, 18M, 18C, and 18K) which will be described later with a light beam L modulated according to the received image data.

Each image forming unit 16 includes the image holding member 18 that is rotationally driven in one direction. As the light beam L is irradiated onto each image holding member 18 from each exposure device 40, an electrostatic latent image is formed on each image holding member 18.

A corona discharge type scorotron charger (non-contact charge type) that charges the image holding member 18, and a developing device that develops the electrostatic latent image formed on the image holding member 18 using a developer in the exposure device 40 are provided around each image holding member 18. Further, a blade that removes the developer that remains on the image holding member 18 after transfer, and a charge eliminator that irradiates the image holding member 18 after transfer with light to perform charge elimination are provided around each image holding member 18. The scorotron charger, the developing device, the blade, and the charge eliminator are sequentially arranged from an upstream side to a downstream side of the image holding member 18 in a rotation direction so as to face a front surface of the image holding member 18.

Further, a transfer unit 32 is provided on a lower side of each image forming unit 16. The transfer unit 32 includes a ring-shaped intermediate transfer belt 34 that is in contact with each image holding member 18, and a primary transfer roll that multi-transfers the toner images formed on the respective image holding members 18 onto the intermediate transfer belt 34.

The intermediate transfer belt 34 is wound on a driving roll 38 that is driven by a motor (not shown), a tension applying roll 41 that applies tension to the intermediate transfer belt 34, a facing roll 42 that faces a secondary transfer roll 62 (which will be described later), and plural winding rolls 44. Further, the intermediate transfer belt 34 is driven in one direction (a counterclockwise direction in FIG. 2) by the driving roll 38.

Each primary transfer roll 36 is disposed to face the image holding member 18 of each image forming unit 16 with the intermediate transfer belt 34 being interposed therebetween. Further, each primary transfer roll 36 is supplied with a transfer bias voltage having a reversed polarity with respect to a polarity of the toner from a power supply unit (not shown). Using such a configuration, the toner image formed in each image holding member 18 is transferred onto the intermediate transfer belt 34.

On a side opposite to the driving roll 38 with the intermediate transfer belt 34 being interposed therebetween, a remover 46 that removes the toner, powder or the like that remains on the intermediate transfer belt 34 by contacting a blade with the intermediate transfer belt 34 is provided.

On the other hand, two paper containers 48 that store sheets of paper P which are an example of a recording medium are provided under the transfer unit 32 along the horizontal direction.

Each paper container 48 is freely drawn out of the first housing 10A. In an upper part on one end side (right side in FIG. 2) of each paper container 48, a feeding roll 52 that feeds the paper P from each paper container 48 to a transport path 60 is provided.

A bottom plate 50 on which the paper P is loaded is provided in each paper container 48. If the paper container 48 is drawn out of the first housing 10A, the bottom plate 50 descends according to an instruction from a control device 20 (which will be described later). As the bottom plate 50 descends, a space is formed where a user may supply the sheets of paper P in the paper container 48.

If the paper container 48 drawn out of the first housing 10A is mounted to the first housing 10A, the bottom plate 50 ascends according to an instruction from the control device 20. As the bottom plate 50 ascends, the uppermost paper P loaded on the bottom plate 50 and the feeding roll 52 come into contact with each other.

On a downstream side of the feeding roll 52 in a transport direction of the paper P (hereinafter, simply referred to as a "downstream side"), separating rolls 56 that separate the sheets of paper P multi-fed from the paper container 48 one by one are provided. On a downstream side of the separating rolls 56, plural transport rolls 54 that transport the paper P to the downstream side are provided. Hereinafter, the respective rolls of the feeding roll 52, the transport rolls 54, and the separating rolls 56 are generally referred to as a "driving member".

A transport path 60 is provided between the paper container 48 and the transfer unit 32. The transport path 60 extends to a transfer position T between the secondary transfer roll 62 and the facing roll 42 so as to fold the paper P fed from the paper container 48 with a first folding part 60A back toward the left side in FIG. 2 and to fold the paper P with a second folding part 60B back toward the right side in FIG. 2.

The secondary transfer roll 62 is supplied with a transfer bias voltage having a reversed polarity with respect to the polarity of the toner from a power supply unit. With such a configuration, the toner images of the respective colors multi-transferred onto the intermediate transfer belt 34 are secondarily transferred onto the paper P transported along the transport path 60 by the secondary transfer roll 62.

A spare path 66 that extends through a side surface of the first housing 10A is provided to merge into the second folding part 60B of the transport path 60. A sheet of paper P fed from another paper container (not shown) disposed adjacently to the first housing 10A passes through the spare path 66 to enter the transport path 60.

On a downstream side of the transfer position T, plural transport belts 70 that transport the paper P to which the toner image is transferred toward the second housing 10B are provided in the first housing 10A, and a transport belt 80 that transports the paper P transported by the transport belts 70 to the downstream side is provided in the second housing 10B.

Each of the plural transport belts 70 and the transport belt 80 is formed in a ring shape, and is wound on a pair of winding rolls 72. The pair of winding rolls 72 is disposed on the upstream side and the downstream side in the transport direction of the paper P, in which one winding roll is rotationally driven to circularly move the transport belt 70 (transport belt 80) in one direction (a clockwise direction in FIG. 2).

On a downstream side of the transport belt 80, a fixing unit 82 that fixes the toner image transferred on the surface of the paper P to the paper P by heat and pressure is provided.

The fixing unit 82 includes a fixing belt 84, and a pressure roll 88 that is disposed to be in contact with the fixing belt 84 from a lower side. A fixing portion N in which the paper P is pressed and heated to fix the toner image is formed between the fixing belt 84 and the pressure roll 88.

The fixing belt 84 is formed in a ring shape, and is wound on a driving roll 89 and a driven roll 90. The driving roll 89 faces the pressure roll 88 from an upper side, and the driven roll 90 is disposed on an upper side of the driving roll 89.

A heating unit such as a halogen lamp is built in the driving roll 89 and the driven roll 90, respectively. The fixing belt 84 is heated by the heating unit.

On a downstream side of the fixing unit 82, a transport belt 108 that transports the paper P fed from the fixing unit 82 to the downstream side is provided. The transport belt 108 is formed in a similar way to the transport belt 70.

On a downstream side of the transport belt 108, a cooling unit 110 that cools the paper P heated by the fixing unit 82 is provided.

The cooling unit 110 includes an absorbing device 112 that absorbs heat in the paper P, and a pressing device 114 that presses the paper P against the absorbing device 112. The absorbing device 112 is disposed on one side (upper side in FIG. 2) with respect to the transport path 60, and the pressing device 114 is disposed on the other side (lower side in FIG. 2).

The absorbing device 112 includes a ring-shaped absorbing belt 116 that is in contact with the paper P and absorbs the heat in the paper P. The absorbing belt 116 is wound on a driving roll 120 that transmits a drive force to the absorbing belt 116, and plural winding rolls 118.

Inside an inner circumference of the absorbing belt 116, a heat sink 122 formed of aluminum that is in surface contact with the absorbing belt 116 and radiates heat absorbed by the absorbing belt 116 is provided.

Further, a fan 128 for taking heat away from the heat sink 122 in order to discharge hot air to the outside is disposed on a rear side (on an inner side of a paper plane shown in FIG. 2) of the second housing 10B.

The pressing device 114 includes a ring-shaped pressing belt 130 that transports the paper P while pressing the paper P against the absorbing belt 116. The pressing belt 130 is wound on plural winding rolls 132.

On a downstream side of the cooling unit 110, a correction device 140 that transports the paper P with the paper P passing therethrough to correct curling of the paper P is provided.

On a downstream side of the correction device 140, an inline sensor (registered trademark) 200 that detects toner concentration error, image error, image position error and the like of the toner image fixed to the paper P is provided.

On a downstream side of the inline sensor 200, exit rolls 198 that discharge the paper P with an image being formed on one surface thereof to a discharge unit 196 attached to a side surface of the second housing 10B is provided.

On the other hand, when forming images on both sides of the paper P, the paper P fed from the inline sensor 200 is transported to a reversal path 194 provided on a downstream side of the inline sensor 200.

A branch path 194A that is branched from the transport path 60 and a paper transport path 194B that transports the paper P transported along the branch path 194A toward the first housing 10A are provided in the reversal path 194. Further, in the reversal path 194, a reversal path 194C that folds back the paper P transported along the paper transport path 194B in a backward direction for switch-back transport in order to reverse the front and back surfaces is provided.

With such a configuration, the paper P switch-back-transported by the reversal path 194C is transported toward the first housing 10A, enters the transport path 60 provided above the paper container 48, and is fed again to the transfer position T.

Next, an image forming process of the image forming apparatus 10 according to the present exemplary embodiment will be described.

The image data that is image-processed by the image signal processing unit 13 is fed to each exposure device 40. Each exposure device 40 emits each light beam L according to the image data to expose each image holding member 18 charged by the scorotron charger, to thereby form an electrostatic latent image on each image holding member 18.

The electrostatic latent image formed on the image holding member 18 is developed by the developing device to form toner images of the respective colors of the first special color (V), the second special color (W), yellow (Y), magenta (M), cyan (C), and black (K).

The toner images of the respective colors formed on the image holding members 18 of the respective image forming units 16V, 16W, 16Y, 16M, 16C, and 16K are sequentially multi-transferred onto the intermediate transfer belt 34 by six primary transfer rolls 36V, 36W, 36Y, 36M, 36C, and 36K.

The toner images of the respective colors that are multi-transferred onto the intermediate transfer belt 34 are secondarily transferred on the paper P transported from the paper container 48 by the secondary transfer roll 62. The paper P on which the toner images are transferred is transported toward the fixing unit 82 provided inside the second housing 10B by the transport belt 70.

The toner images of the respective colors on the paper P are heated and pressed by the fixing unit 82 so as to be fixed to the paper P. Further, the paper P to which the toner images are fixed passes through the cooling unit 110 to be cooled, and then is fed to the correction device 140 so that the crumpling generated in the paper P is corrected.

Image error or the like in the paper P in which the crumpling is corrected is detected by the inline sensor 200, and then, is discharged to the discharge unit 196 by the exit rolls 198.

On the other hand, when forming an image on a non-image surface (back surface) on which the image of the paper P is not formed (duplex printing), after the paper P passes through the inline sensor 200, the paper P is reversed by the reversal path 194. Further, the reversed paper P is fed to the transport path 60 provided above the paper container 48, so that toner images are formed on the back surface in the above-described procedure.

Next, a configuration of a transport unit 210 according to the present exemplary embodiment will be described in detail with reference to FIG. 3.

Figure 3:
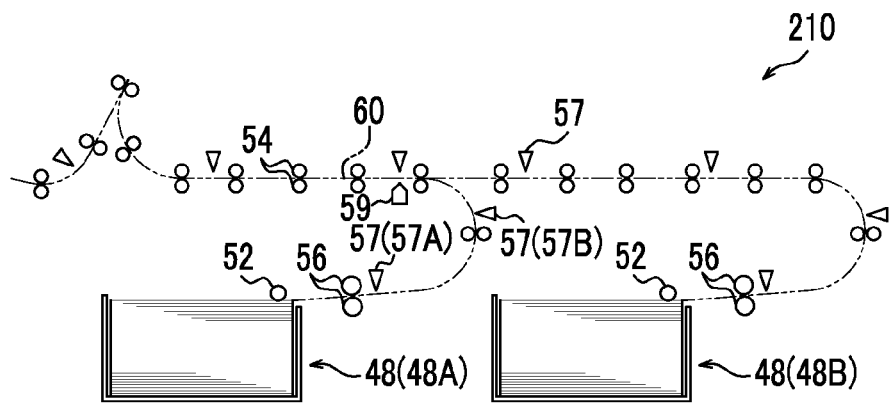
FIG. 3 is a schematic configuration diagram (sectional side view) of a transport unit of the image forming apparatus according to the exemplary embodiment.

As shown in FIG. 3, the transport unit 210 according to the present exemplary embodiment includes the paper container 48, the feeding roll 52, the transport rolls 54, the separating rolls 56, and the transport path 60. Further, the transport unit 210 includes plural (nine in the example shown in FIG. 3) timing sensors 57 and a multi feed sensor 59.

The plural timing sensors 57 according to the present exemplary embodiment are provided along the transport path 60. Further, the timing sensors 57 are provided so that at least one pair of transport rolls 54 is disposed between the timing sensors 57 that are adjacent to each other along the transport path 60. Each timing sensor 57 detects a timing at which a leading edge of the paper P passes through a position (hereinafter, simply referred to as a "detection position") on the transport path 60 corresponding to a position where the timing sensor 57 is provided.

Specifically, the timing sensor 57 is in an ON state at a timing when the leading edge of the paper P passes through the detection position, and is in an OFF state at a timing when a trailing edge of the paper P passes through the detection position. As the timing sensor 57 according to the present exemplary embodiment, for example, a sensor in the related art such as a transmission type sensor or a reflection type sensor disclosed in JP-A-2005-206307 may be applied.

On the other hand, the multi feed sensor 59 according to the present exemplary embodiment is provided in the vicinity of a downstream side of a junction of the respective transport paths 60 in the transport direction. The multi feed sensor 59 detects that plural sheets of paper P are transported in a state of being overlapped (hereinafter, referred to as "multi feed"). As the multi feed sensor 59 according to the present exemplary embodiment, a known sensor in the related art may be applied.

Next, a configuration of main units of an electric system of the image forming apparatus 10 according to the present exemplary embodiment will be described with reference to FIG. 4.

Figure 4:
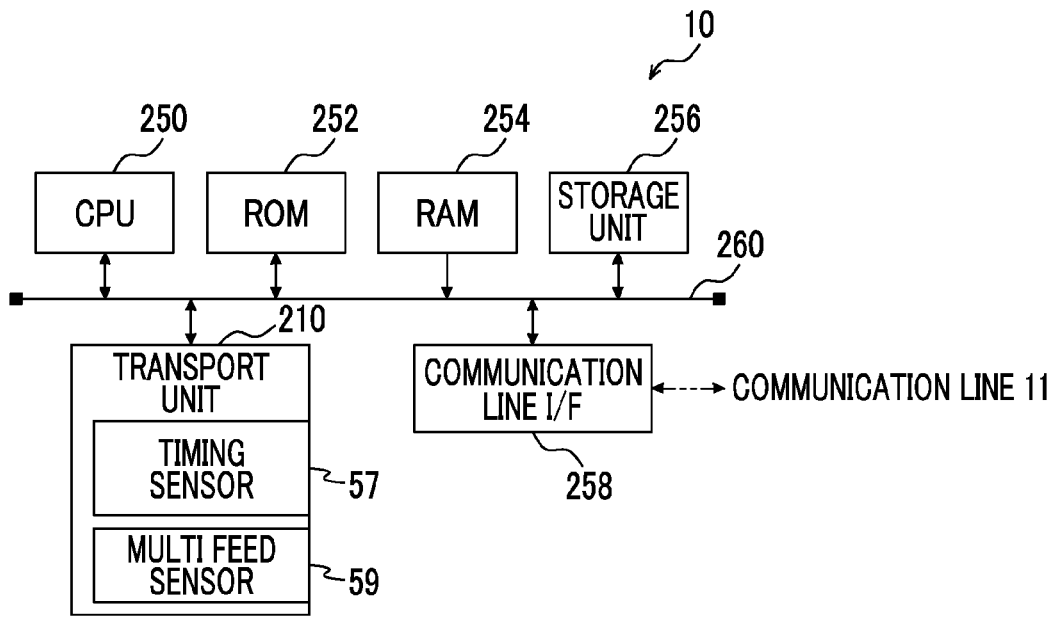
FIG. 4 is a block diagram illustrating a configuration of main units of an electric system of the image forming apparatus according to the exemplary embodiment.

As shown in FIG. 4, the image forming apparatus 10 according to the present exemplary embodiment includes a central processing unit (CPU) 250 that manages overall operation of the image forming apparatus 10, and a read only memory (ROM) 252 in which various programs, various parameters or the like are stored in advance. Further, the image forming apparatus 10 also includes a random access memory (RAM) 254 which is used as a work area when the various programs are executed by the CPU 250, and a non-volatile storage unit 256 such as a flash memory. In addition, the image forming apparatus 10 also includes a communication line interface (I/F) 258 that is connected to the communication line 11 and performs transmission and reception of communication data with another external device connected to the communication line 11.

Further, the respective units are connected to each other through a bus 260 such as an address bus, a data bus and a control bus. Further, each timing sensor 57 and the multi feed sensor 59 provided in the transport unit 210 are also connected to the bus 260. With such a configuration, a timing when each timing sensor 57 is in the ON state and a timing when each timing sensor 57 is in the OFF state are detected through the bus 260 using the CPU 250. Accordingly, a period from the time when the leading edge of the paper P passes through the detection position to the time when each timing sensor 57 is in the ON state (hereinafter, referred to as a "first transit time") is detected using a time point when paper feeding from the paper container 48 is started as a starting point, using the CPU 250. Further, since an installation position of each timing sensor 57 is fixed in advance, the timing sensor 57 which obtains information on the detected first transit time may be specified using the CPU 250.

Further, a fault (so-called misfeed) and a paper jam (so-called jam) in which the paper P is not supplied from the paper container 48 according to the state of each timing sensor 57 may be detected using the CPU 250. Specifically, these faults are detected by detecting that each timing sensor 57 is not in the ON state even when exceeding a predetermined period range which is a period when the paper P is normally transported for each timing sensor 57, using the CPU 250. Hereinafter, the misfeed and jam are generally referred to as a "transport stop fault".

Further, the multi feed is detected by the output from the multi feed sensor 59 through the bus 260, using the CPU 250. Hereinafter, transport faults of the paper P such as the misfeed, jam or multi feed are generally referred to as a "paper transport fault".

A configuration of main units of an electric system of the maintenance necessity estimation apparatus 310 according to the present exemplary embodiment will be described with reference to FIG. 5.

Figure 5:
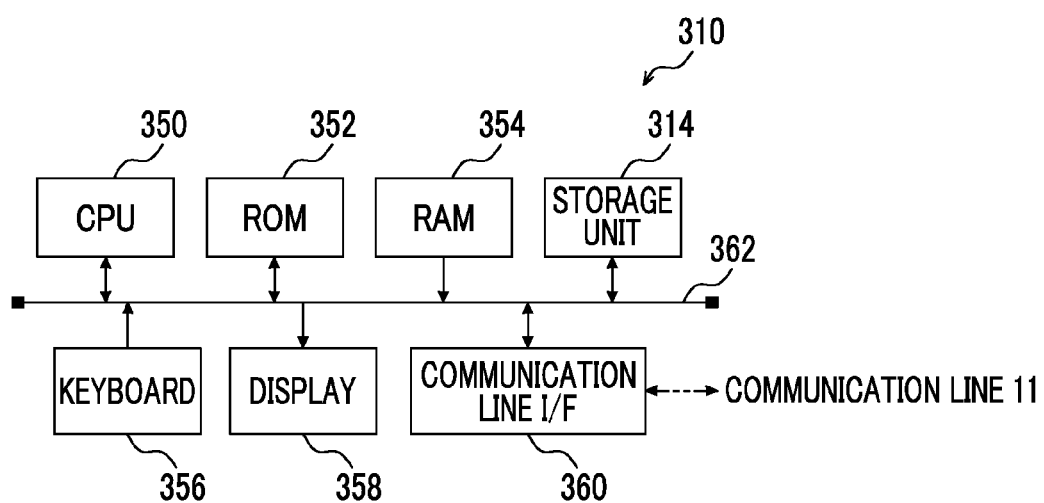
FIG. 5 is a block diagram illustrating a configuration of main units of an electric system of the maintenance necessity estimation apparatus according to the exemplary embodiment.

As shown in FIG. 5, the maintenance necessity estimation apparatus 310 according to the present exemplary embodiment includes a central processing unit (CPU) 350 that manages overall operation of the maintenance necessity estimation apparatus 310, and a ROM 352 in which various programs, various parameters or the like are stored in advance. Further, the maintenance necessity estimation apparatus 310 also includes a RAM 354 which is used as a work area when the various programs are executed by the CPU 350, and a non-volatile storage unit 314 such as a hard disk drive (HDD).

In addition, the maintenance necessity estimation apparatus 310 also includes a keyboard 356 through which a variety of information is input, and a display 358 that displays a variety of information. Further, the maintenance necessity estimation apparatus 310 also includes a communication line I/F 360 that is connected to the communication line 11 and performs transmission and reception of communication data with another external device connected to the communication line 11. The respective units are connected to each other through a bus 362 such as an address bus, a data bus and a control bus.

However, in the image forming apparatus 10 according to the present exemplary embodiment, the paper transport fault may occur due to a state change of the driving member due to aging, attachment of paper powder, dust or the like to the driving member when forming the image, or the like. Further, when the paper transport fault occurs, maintenance work performed by a maintenance person such as exchange or cleaning of the driving member may be necessary, and in this case, while the maintenance person performs the maintenance work, usage of the image forming apparatus 10 is stopped. Thus, if the occurrence of the paper transport fault may be ascertained in advance and the maintenance work may be performed before the paper transport fault occurs at a time when the usage frequency of the image forming apparatus 10 is low, for example, at night or on a holiday, user convenience may be improved, which is preferable.

Thus, a maintenance necessity estimation function for estimating the degree of necessity of the maintenance work with respect to the driving member (hereinafter, referred to as a "maintenance work necessity") is included in the maintenance necessity estimation apparatus 310 according to the present exemplary embodiment. Further, an information transmission function for transmitting information necessary for realization of the maintenance necessity estimation function to the maintenance necessity estimation apparatus 310 is included in the image forming apparatus 10 according to the present exemplary embodiment.

Figure 6:
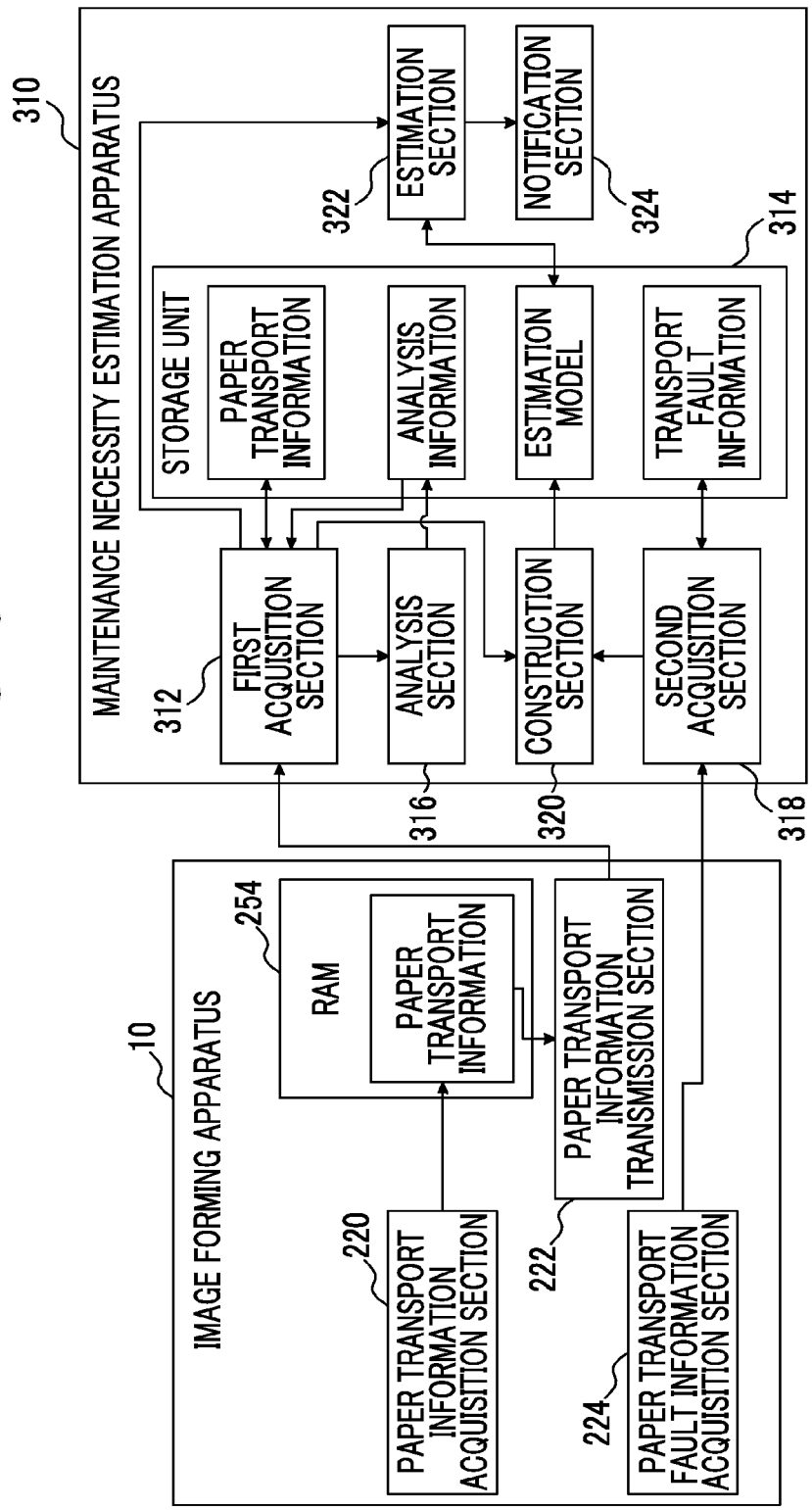
FIG. 6 is a functional block diagram illustrating a functional configuration of an image forming apparatus and a maintenance necessity estimation apparatus according to a first exemplary embodiment.

Next, the information transmission function and the maintenance necessity estimation function will be described with reference to FIG. 6. FIG. 6 is a functional block diagram for executing the information transmission function and the maintenance necessity estimation function according to the present exemplary embodiment. As shown in FIG. 6, the image forming apparatus 10 according to the present exemplary embodiment includes a paper transport information acquisition section 220, a paper transport information transmission section 222, and a paper transport fault information acquisition section 224.

The paper transport information acquisition section 220 according to the present exemplary embodiment acquires the first transit time for each timing sensor 57 with respect to sheets of paper P that are continuously transported as a predetermined number of sheets M1 (in this exemplary embodiment, for example, 20) in each predetermined period T1 (in this exemplary embodiment, a period when an image is formed on 1000 sheets of paper P, for example) that is set in advance as a period when information is to be acquired. Further, the paper transport information acquisition section 220 also acquires paper feature information indicating the features of the paper P and container information for identifying the paper container 48 in which the sheets of paper P are stored, according to an image forming instruction input from the outside. In this exemplary embodiment, as the paper feature information, for example, information indicating the type thereof corresponding to the features of the front surface of the paper P such as plain paper or coated paper is applied. In the following description of the exemplary embodiments, two types of sheet feature information of the plain paper and the coated paper are used, but specific types such as enameled paper, matte paper, photo paper, or pure paper may be used as the sheet feature information as necessary. As the paper feature information, information of grammage (g/m$^2$) that means the mass per area of paper measured in grams per square meter may be used. Information which is distinguished for grammage, or information which is distinguished in stages obtained by classifying the grammage may be available. Information of basis weight that means the weight in pounds of a ream of paper of a basic size can be used in same way as the information of grammage. Further, the size of the paper may be used as the paper feature information. The type of the front surface, the basis weight, or the size of the paper may be independently used or may be used in combination thereof. Further, the paper transport information acquisition section 220 associates the acquired pieces of information with acquisition dates and times to be stored in the RAM 254.

The paper transport information transmission section 222 according to the present exemplary embodiment transmits the acquisition dates and times, the first passage time, the paper feature information and the storage information corresponding to the number of sheets M1 stored in the RAM 254 by the paper transport information acquisition section 220 to the maintenance necessity estimation apparatus 310 through the communication line I/F 258. Further, the paper transport information transmission section 222 also transmits apparatus type information indicating the type of the image forming apparatus 10 and an apparatus ID (identification) for individually identifying the image forming apparatus 10 to the maintenance necessity estimation apparatus 310 through the communication line I/F 258, together with the above-mentioned information. The paper transport information transmission section 222 according to the present exemplary embodiment transmits each piece of information described above to the maintenance necessity estimation apparatus 310 at a timing when each piece of information corresponding to the number of sheets M1 is stored in the RAM 254, a timing when a job (unit of a process executed according to one image forming instruction) is terminated, or the like.

When the paper transport fault occurs, the paper transport fault information acquisition section 224 according to the present exemplary embodiment acquires information indicating the type of misfeed, jam, multi feed, and the like (hereinafter, referred to as "fault type information"). Further, the paper transport fault information acquisition section 224 transmits the date and time when the fault type information is acquired, the fault type information, and the above-described apparatus type information and apparatus ID to the maintenance necessity estimation apparatus 310 through the communication line I/F 258. The paper transport fault information acquisition section 224 according to the present exemplary embodiment transmits each piece of information described above to the maintenance necessity estimation apparatus 310 whenever the information is acquired.

On the other hand, the maintenance necessity estimation apparatus 310 according to the present exemplary embodiment includes a first acquisition section 312, an analysis section 316, a second acquisition section 318, a construction section 320, an estimation section 322, and a notification section 324.

The first acquisition section 312 according to the present exemplary embodiment acquires acquisition date and time, first transit time, paper feature information, container information, apparatus type information, and apparatus ID transmitted by the paper transport information transmission section 222 through the communication line I/F 360. Further, the first acquisition section 312 associates the acquired pieces of information to be stored in the storage unit 314 with each other, and outputs the information to the analysis section 316. FIG. 7 schematically shows an example of the information (hereinafter, referred to as "paper transport information") stored in the storage unit 314 by the first acquisition section 312 according to the present exemplary embodiment.

As shown in FIG. 7, the paper transport information according to the present exemplary embodiment includes acquisition date and time, apparatus information, paper feature information, and first transit time. Further, the apparatus information includes apparatus type information, an apparatus ID, and container information.

The acquisition date and time, the apparatus information, the paper feature information, and the first transit time are the respective pieces of information transmitted from the above-described paper transport information transmission section 222. The first transit time is information indicating the first transit time (unit: millisecond) acquired by the paper transport information acquisition section 220 for each timing sensor 57. As an example, a container Y1 shown in FIG. 7 corresponds to a paper container 48A shown in FIG. 3, and a sensor S1 and a sensor S2 shown in FIG. 7 correspond to a timing sensor 57A and a timing sensor 57B shown in FIG. 3, respectively. Further, for ease of understanding, in FIG. 7, the first transit time with respect to sensors other than the sensor S1 and the sensor S2 is not shown.

The analysis section 316 according to the present exemplary embodiment analyzes the paper transport information input from the first acquisition section 312, and stores information (hereinafter, referred to as "analysis information") acquired by the analysis in the storage unit 314 for each piece of apparatus type information. Specifically, the analysis section 316 derives an average value and a square root (standard deviation) of a variance value of transit times as statistics indicating features of a transport state (hereinafter, referred to as "transport state feature values") of the paper P, from the first transit times corresponding to the number of sheets M1 included in the paper transport information for each type of paper. FIG. 8 schematically shows an example of the analysis information according to the present exemplary embodiment in the image forming apparatus 10 of the same apparatus type.

As shown in FIG. 8, the analysis information according to the present exemplary embodiment includes acquisition date and time, paper feature information, and transport state feature values. Further, the transport state feature values includes an average value and a square root of a variance value of the first transit times for each timing sensor 57, and an average value and a square root of a variance value of transit times (hereinafter, referred to as "second transit times") of the paper P between the respective timing sensors 57 that are adjacently disposed along the transport path 60. Each second transit time is derived by subtracting the first transit time of the timing sensor 57 disposed on an upstream side in the transport direction from the first transit time of the timing sensor 57 disposed on a downstream side in the transport direction in a combination (hereinafter, referred to as a "sensor pair") of the respective timing sensors 57 that are adjacently disposed along the transport path 60.

Figure 9A:
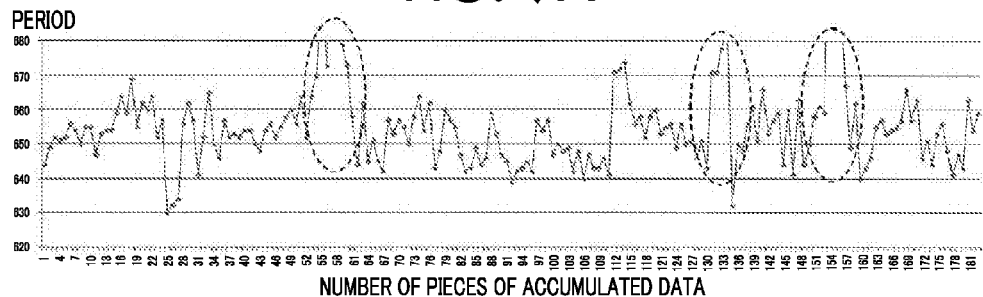
FIG. 9A is a graph illustrating an example of a change of a first transit time when plain paper is transported.
Figure 9B:
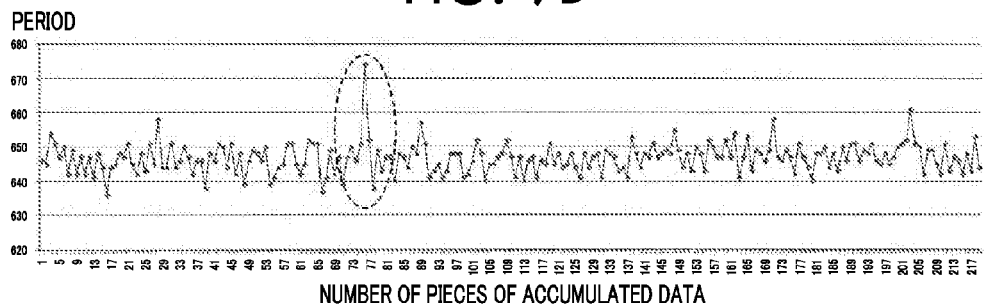
FIG. 9B is a graph illustrating an example of a change of the first transit time when coated paper is transported.
Figure 9C:
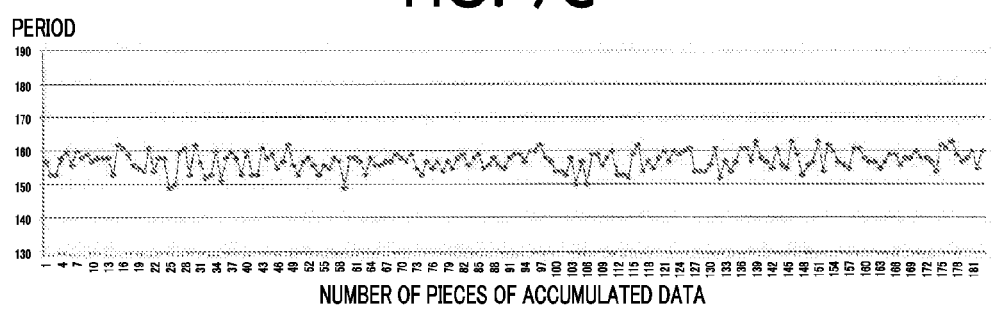
FIG. 9C is a graph illustrating an example of a change of a second transit time between timing sensors when the plain paper is transported.
Figure 9D:
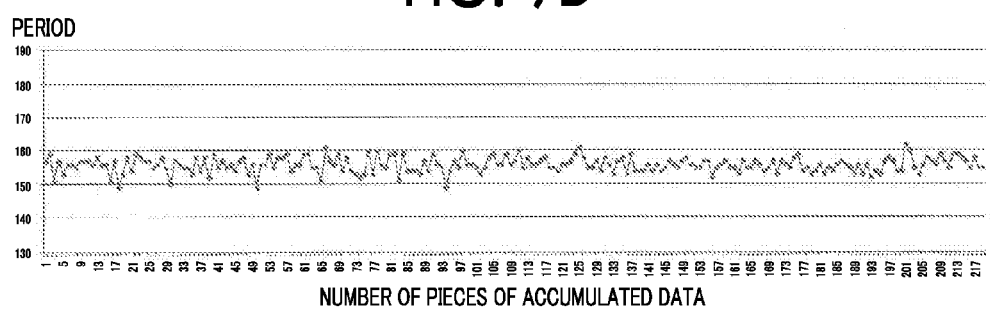
FIG. 9D is a graph illustrating an example of a change of the second transit time between the timing sensors when the coated paper is transported.

Further, FIGS. 9A to 9D show graphs indicating temporal changes of the first transit time of the sensor S1 and the second transit time between the sensor S1 and the sensor S2 for each type of paper. Here, FIG. 9A shows the first transit time of the sensor S1 when plain paper is transported, and FIG. 9B shows the first transit time of the sensor S1 when coated paper is transported. FIG. 9C shows the second transit time between the sensor S1 and the sensor S2 when the plane paper is transported, and FIG. 9D shows the second transit time between the sensor S1 and the sensor S2 when the coated paper is transported. In FIGS. 9A to 9D, the vertical axis represents a period (ms), and the horizontal axis represents the number of pieces of accumulated data acquired by the first acquisition section 312, in which data shown on the right side corresponds to data acquired later.

The second acquisition section 318 according to the present exemplary embodiment acquires the acquisition date and time, the fault type information, the apparatus type information, and the apparatus ID transmitted by the paper transport fault information acquisition section 224 through the communication line I/F 360, and associates the pieces of information to be stored in the storage unit 314. Further, the maintenance person performs the maintenance work with respect to the paper transport fault, and then, adds information indicating the content of the maintenance work (hereinafter, referred to as "maintenance work information") with respect to the information (hereinafter, referred to as "transport fault information") stored in the storage unit 314 by the second acquisition section 318. FIG. 10 schematically shows an example of the transport fault information according to the present exemplary embodiment.

As shown in FIG. 10, the transport fault information according to the present exemplary embodiment includes acquisition date and time, apparatus information, fault type information, and maintenance work information. Further, the apparatus information includes apparatus type information and an apparatus ID, and the maintenance work information includes a maintenance target roll, a sensor pair, and maintenance work content.

Here, the acquisition date and time, the apparatus information, and the fault type information refer to the information transmitted from the paper transport fault information acquisition section 224 to the second acquisition section 318. Further, the maintenance target roll refers to information for individually identifying the target to which the maintenance work such as exchange or cleaning is performed by the maintenance person. Further, the sensor pair refers to information indicating a sensor pair provided at positions with a corresponding maintenance target roll being interposed therebetween, and the maintenance work content refers to information indicating the maintenance work performed by the maintenance person.

The construction section 320 according to the present exemplary embodiment constructs an estimation model that estimates necessity information indicating the degree of necessity of the maintenance work with respect to the driving member for each piece of apparatus type information and each sensor. Specifically, the first acquisition section 312 acquires the paper transport information and the analysis information from the storage unit 314, and outputs the information to the construction section 320. Further, the second acquisition section 318 acquires the transport fault information from the storage unit 314, and outputs the information to the construction section 320. The construction section 320 constructs the estimation model that estimates the necessity information using the paper transport information and the analysis information input by the first acquisition section 312 as input information, and using information corresponding to the transport fault information input by the second acquisition section 318 as output information, and stores the estimation model in the storage unit 314.

The estimation section 322 according to the present exemplary embodiment estimates the necessity information using, as input information, the paper transport information and the analysis information acquired by the first acquisition section 312 with respect to the image forming apparatus 10 which is an estimation target of the necessity information, using the estimation model that is stored in advance in the storage unit 314.

The notification section 324 according to the present exemplary embodiment sends notification indicating that the maintenance work is necessary when the maintenance work necessity indicated by the necessity information estimated by the estimation section 322 is a predetermined threshold value or greater.

In the meanwhile, the processes in the respective components configured as described above may be realized by executing a program, that is, by a software configuration using a computer. Here, the processes are not necessarily realized by the software configuration, but may be realized by a hardware configuration, or by a combination of the hardware configuration and the software configuration. As an example in which the respective components are realized by the hardware configuration, a configuration in which a functional element that executes the same process as that of each component is prepared and applied may be used.

Hereinafter, a case where each component realizes the process in each component by executing the program will be described. In this case, a configuration in which a corresponding program is installed in advance in the image forming apparatus 10 and the maintenance necessity estimation apparatus 310, a configuration in which the corresponding program is provided in a state of being stored in a computer readable recording medium, a configuration in which the corresponding program is distributed through a communication unit in a wired or wireless manner, or the like may be applied.

Figure 11:
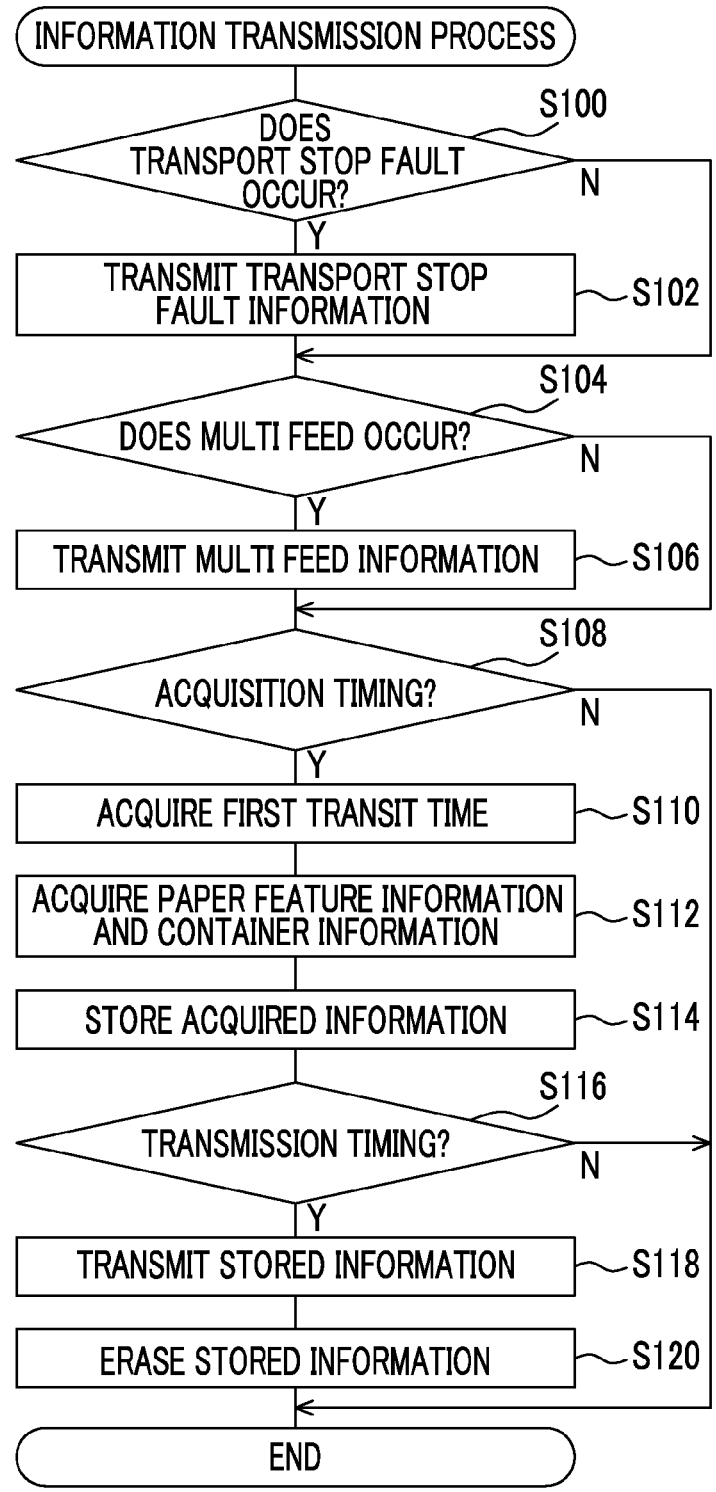
FIG. 11 is a flowchart illustrating the flow of processes in an information transmission processing program according to the exemplary embodiment.

Next, effects of the image forming apparatus 10 according to the present exemplary embodiment will be described with reference to FIG. 11. FIG. 11 is a flowchart illustrating the flow of processes of an information transmission processing program executed by the CPU 250 whenever an image forming instruction with respect to the paper P is input by the image forming apparatus 10. The program is installed in advance in the ROM 252. Here, for simplicity and clarification of description, description of the process of forming the image using the image forming apparatus 10 will not be made.

In step S100 in FIG. 11, the CPU 250 determines whether the transport stop fault occurs based on the output from each timing sensor 57, as described above. When the determination is affirmative, the CPU 250 proceeds to a process of step S102. In step S102, the CPU 250 transmits acquisition data and time of fault type information, the fault type information, and apparatus information and an apparatus ID of a host apparatus to the maintenance necessity estimation apparatus 310 through the communication line I/F 258, and then, proceeds to a process of step S104. On the other hand, when the determination is negative in the process of step S100, the CPU 250 proceeds to a process of step S104 without executing the process of step S102.

In step S104, the CPU 250 determines whether the multi feed occurs based on the output from multi feed sensor 59, as described above. When the determination is affirmative, the CPU 250 proceeds to a process of step S106. In step S106, the CPU 250 transmits acquisition data and time of fault type information, the fault type information, and apparatus information and an apparatus ID of a host apparatus to the maintenance necessity estimation apparatus 310 through the communication line I/F 258, and then, proceeds to a process of step S108. On the other hand, when the determination is negative in the process of step S104, the CPU 250 proceeds to a process of step S108 without executing the process of step S106.

In step S108, the CPU 250 determines whether a predetermined timing occurs as a timing when the first transit time is acquired. When the determination is affirmative, the CPU 250 proceeds to a process of step S110. In the present exemplary embodiment, as described above, a timing when the first transit time corresponding to the number of sheets M1 that are continuously transported is acquired in each period T1 is applied as the timing, but the present exemplary embodiment is not limiting. For example, as the timing, a different timing such as a timing when the paper transport fault is detected or a timing in each predetermined period (for example, 3 hours) may be applied.

In step S110, as described above, the CPU 250 acquires the first transit time for each timing sensor 57, and in step S112, the CPU 250 acquires the paper feature information and the container information as described above. In step S114, the CPU 250 associates the first transit time acquired in the process of step S110 with the paper feature information and the container information acquired in the process of step S112 to be stored in the RAM 254.

In step S116, the CPU 250 determines whether a predetermined timing occurs as a timing when the information stored in the RAM 254 is transmitted. When the determination is affirmative, the CPU 250 proceeds to a process of step S118. In the present exemplary embodiment, as the timing when the information is transmitted, a timing when the information corresponding to the number of sheets M1 is stored in the RAM 254 is applied, but the present exemplary embodiment is not limiting. For example, a different timing such as a timing when the paper transport fault is detected or a timing in each predetermined period (for example, one day) may be applied as the timing when the information is transmitted.

In step S118, the CPU 250 transmits the information stored in the RAM 254 through the process of step S114 and the apparatus type information and the apparatus ID of the host apparatus to the maintenance necessity estimation apparatus 310 through the communication line I/F 258. In step S120, the CPU 250 erases the information stored in the RAM 254 through the process of step S114, and terminates the information transmission processing program. On the other hand, when the determination is negative in the process of S108 or step S116, the CPU 250 terminates the information transmission processing program.

Figure 12:
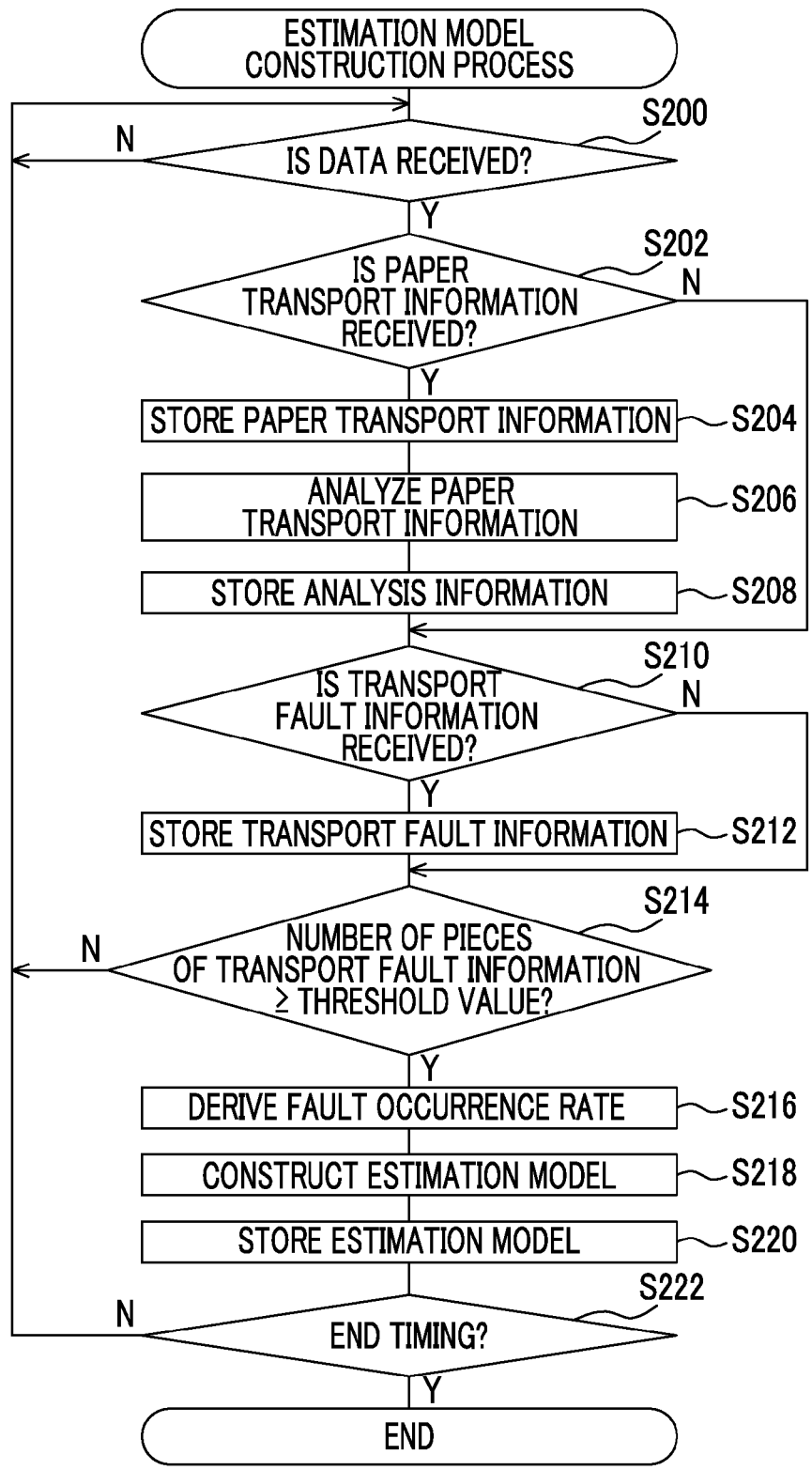
FIG. 12 is a flowchart illustrating the flow of processes in an estimation model construction processing program according to the first exemplary embodiment.
Figure 13:
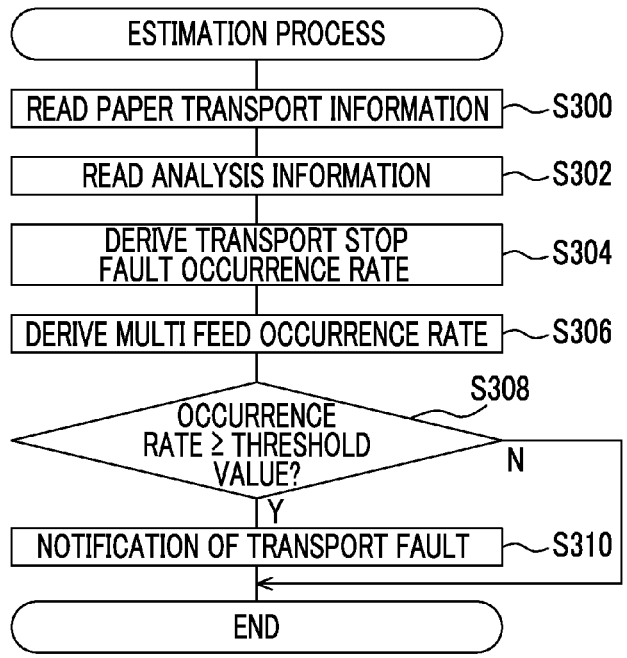
FIG. 13 is a flowchart illustrating the flow of processes in an estimation processing program according to the first exemplary embodiment.

Next, effects of the maintenance necessity estimation apparatus 310 according to the present exemplary embodiment will be described with reference to FIGS. 12 and 13. FIG. 12 is a flowchart illustrating the flow of processes of an estimation model construction processing program executed by the CPU 350 of the maintenance necessity estimation apparatus 310 at a timing when power of the maintenance necessity estimation apparatus 310 is in an on state. Further, FIG. 13 is a flowchart illustrating the flow of processes of an estimation processing program executed by the CPU 350 of the maintenance necessity estimation apparatus 310 in each predetermined period (for example, one day). The respective programs are installed in advance in the ROM 352.

First, the flow of the processes of the estimation model construction processing program will be described with reference to FIG. 12.

In step S200 in FIG. 12, the CPU 350 waits until the information transmitted through the process of step S102, step S106 or step S118 of the information transmission processing program is received. In step S202, the CPU 350 determines whether the information received through the process of step S200 is paper transport information, and when the determination is affirmative, the CPU 350 proceeds to a process of step S204.

In step S204, the CPU 350 stores the received paper transport information in the storage unit 314. As schematically illustrated in FIG. 7, the paper transport information is stored in the storage unit 314 through the process of step S204. In step S206, the CPU 350 analyzes the paper transport information received through the process of step S200 as described above. In step S208, the CPU 350 stores analysis information acquired through the analysis of step S206 in the storage unit 314, and then, the CPU 350 proceeds to a process of step S210. As schematically illustrated in FIG. 8, the analysis information is stored in the storage unit 314 through the processes of step S206 and S208. On the other hand, when the determination is negative in step S202, the CPU 350 proceeds to a process of step S210 without executing the processes of steps S204 to S208.

In step S210, the CPU 350 determines whether the information received through the process of step S200 is the transport fault information, and when the determination is affirmative, the CPU 350 proceeds to a process of step S212. In step S212, as described above, the CPU 350 stores the transport fault information received through the process of step S200 in the storage unit 314, and then, the CPU 350 proceeds to the process of step S214. As described above, the maintenance person adds the maintenance work information to the transport fault information stored through the process of step S212 through the keyboard 356, for example. Thus, as schematically illustrated in FIG. 10, the transport fault information is stored in the storage unit 314. On the other hand, when the determination is negative in step S210, the CPU 350 proceeds to the process of step S214 without executing the process of step S212.

In step S214, the CPU 350 determines whether the number of records of the transport fault information stored in the storage unit 314 is a predetermined threshold value or greater (in the present exemplary embodiment, for example, 30). When the determination is affirmative, the CPU 350 proceeds to a process of step S216, and when the determination is negative, the CPU 350 returns to the process of step S200.

In step s216, the CPU 350 derives a fault occurrence rate (frequency of the occurrence of a fault) indicated by the number of fault occurrences per unit number of sheets of paper P (in the present exemplary embodiment, 10000 sheets) based on the transport fault information and the paper transport information, with respect to both the transport stop fault and the multi feed. In step S218, the CPU 350 reads the entirety of respective pieces of information of the paper transport information and the analysis information from the storage unit 314, and constructs the estimation model for each apparatus type and for each sensor pair using the respective pieces of information as input information, and using the fault occurrence rate derived through the process of step S216 as output information.

Here, the construction of the estimation model will be described in detail. In the present exemplary embodiment, for example, multiple regression analysis is used in the construction of the estimation model. Here, for ease of understanding, a case where the estimation model is constructed with respect to the sensor pair of the sensor S1 and the sensor S2 will be described, further, the estimation model is similarly constructed with respect to a different sensor pair.

In the present exemplary embodiment, as input information regarding the multiple regression analysis (explanatory variables), two types of paper feature information (plain paper or coated paper), information corresponding to two types of transit times (the first transit time of the sensor S1, and the second transit time between the sensor S1 and sensor S2) are applied. Further, in the present exemplary embodiment, as the input information regarding the multiple regression analysis, two types of transport state feature values (an average value and a square root of a variance value of the respective transit times) with respect to respective pieces of the information corresponding to the two types of transit times are also applied. On the other hand, in the present exemplary embodiment, as output information regarding the multiple regression analysis (objective variables), occurrence rates of the transport stop fault and the multi feed are respectively applied. Further, the CPU 350 performs the multiple regression analysis using the input information and the output information to acquire multiple regression analysis coefficients and constant terms. The next expressions (1) and (2) show expressions of the multiple regression analysis according to the present exemplary embodiment.

$$P_m(t_n)=a_1 \times x_1(t_n)+a_2 \times x_2(t_n)+ \ldots +a_8 \times x_8(t_n)+c1 \quad (1)$$

$$P_d(t_n)=b_1 \times x_1(t_n)+b_2 \times x_2(t_n)+ \ldots +b_8 \times x_8(t_n)+c2 \quad (2)$$

$P_m(t_n)$: transport stop fault occurrence rate at timing $t_n$ $P_d(t_n)$: multi feed occurrence rate at timing $t_n$ $a_1$ to $a_8$: multiple regression analysis coefficients of estimation model of transport stop fault occurrence rate with respect to each piece of input information $b_1$ to $b_8$: multiple regression analysis coefficients of estimation model of multi feed occurrence rate with respect to each piece of information $x_1(t_n)$ to $x_8(t_n)$: each piece of input information at timing $t_n$ c1: constant term of estimation model of transport stop fault occurrence rate c2: constant term of estimation model of multi feed occurrence rate In this way, in the present exemplary embodiment, a linear function is applied as a regression expression used in multiple regression analysis, but the present exemplary embodiment is not limiting. For example, a quadratic function or an exponential function may be applied as the regression expression according to an experimental rule or the like. Further, the multiple regression analysis coefficients $a_1$ to $a_8$ and $b_1$ to $b_8$ may be applied by selecting a predetermined number of multiple regression analysis coefficients using an information criterion such as an Akaike's information criterion (AIC) as an evaluation index to improve versatility of the estimation model.

In step S220, the CPU 350 stores the multiple regression analysis coefficients and the constant terms derived in the process of step S218 in the storage unit 314, to store (update) the estimation model. In step S222, the CPU 350 determines whether a predetermined end timing occurs. When the determination is negative, the CPU 350 returns to the process of step S200, and when the determination is affirmative, the CPU 350 terminates the estimation model construction process. In the present exemplary embodiment, as an end timing applied in the process of step S222, a timing when a power switch of the maintenance necessity estimation apparatus 310 is in an off state is applied, but the present exemplary embodiment is not limiting. For example, as the end timing, a different timing such as a timing when an instruction input indicating end of the estimation model construction processing program through the keyboard 356 or the like is performed may be applied.

Next, the flow of the processes in the estimation processing program that estimates the maintenance work necessity using the estimation model constructed by the estimation model construction processing program will be described with reference to FIG. 13.

In step S300 in FIG. 13, the CPU 350 reads the latest paper transport information for which the estimation of the maintenance work necessity is not performed in the paper transport information stored in the storage unit 314. In step S302, the CPU 350 reads analysis information corresponding to the paper transport information read through the process of step S300, stored in the storage unit 314. In step S304, the CPU 350 derives the transport stop fault occurrence rate for each apparatus and for each sensor pair using each piece of information read through the process of step S300 and each piece of information read through the process of step S302 as input information as input information using the estimation model that estimates the transport stop fault occurrence rate stored in the storage unit 314. In step S306, the CPU 350 derives the multi feed occurrence rate for each apparatus and for each sensor pair using each piece of information read through the process of step S300 and each piece of information read through the process of step S302 as input information using the estimation model that estimates the multi feed occurrence rate stored in the storage unit 314.

In step S308, the CPU 350 determines whether at least one of the transport stop fault occurrence rate derived through the process of step S304 and the multi feed occurrence rate derived through the process of step S306 is a predetermined threshold value or greater. When the determination is affirmative, the CPU 350 proceeds to a process of step S310. The threshold value used in the process of step S308 may be different values or the same value for the transport stop fault occurrence rate and the multi feed occurrence rate. Further, the threshold value may be set according to promptness of a required countermeasure for the transport fault, or may be set by input of a user though the keyboard 356 or the like.

Figure 14:
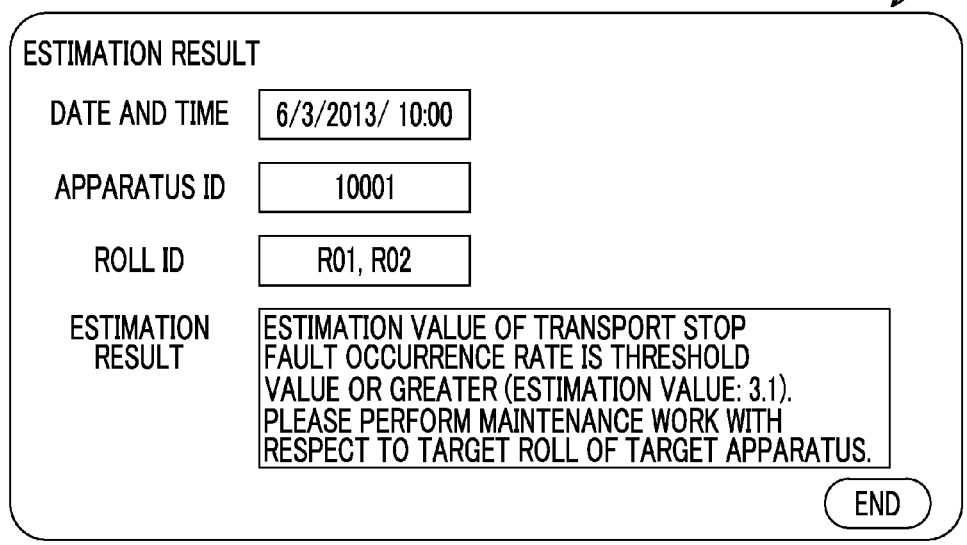
FIG. 14 is a schematic diagram illustrating an example of a transport fault occurrence rate display screen according to the first exemplary embodiment.

In step S310, the CPU 350 displays a transport fault occurrence rate display screen that notifies that at least one of the transport stop fault occurrence rate and the multi feed occurrence rate is the threshold value on the display 358 or greater. FIG. 14 illustrates an example of the transport fault occurrence rate display screen according to the present exemplary embodiment. As shown in FIG. 14, on the transport fault occurrence rate display screen according to the present exemplary embodiment, data and time when the notification is performed, an apparatus ID of the image forming apparatus 10 which is a notification target, and a roll ID of a roll which is a maintenance work target are shown. Further, as shown in FIG. 14, on the transport fault occurrence rate display screen according to the present exemplary embodiment, an estimation result is also shown using a prepared character string and an estimation value. The roll ID of the roll which is the maintenance work target represents information for individually identifying the driving member disposed between the sensor pair corresponding to the estimation model in which the estimation value is the threshold value or greater. Further, when the display of the transport fault occurrence rate display screen is terminated, the user designates an end button displayed in a lower part of the transport fault occurrence rate display screen using the keyboard 356 or the like.

On the other hand, when the determination is negative in step S308, the CPU 350 terminates the estimation processing program without executing the process of step S310.

Figure 15A:
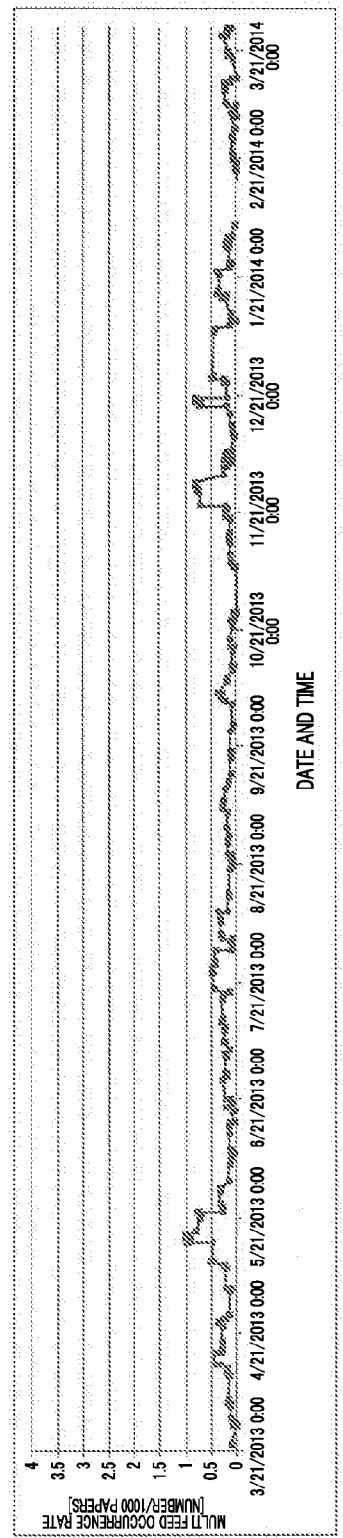
FIG. 15A is a graph illustrating an example of a change of an estimation value of a multi feed occurrence rate according to the first exemplary embodiment.
Figure 15B:
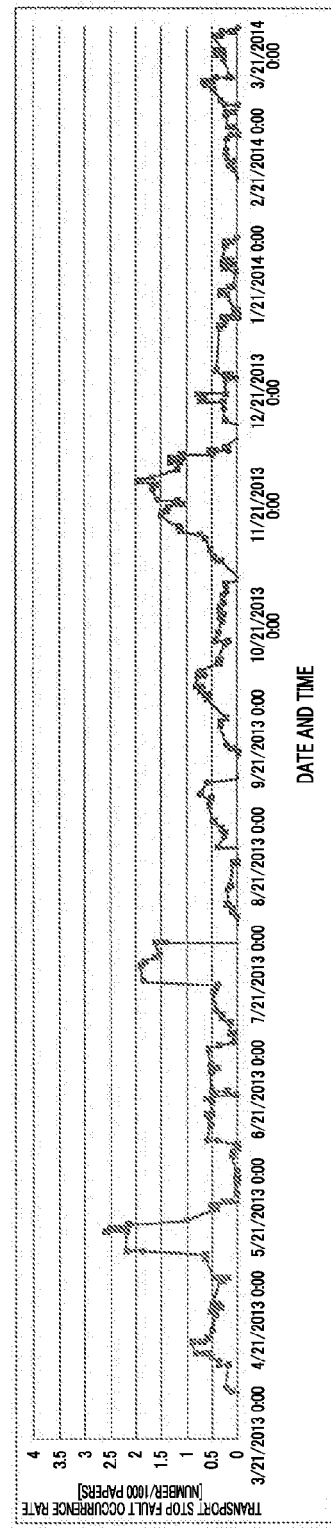
FIG. 15B is a graph illustrating an example of a change of an estimation value of a transport stopping fault occurrence rate according to the first exemplary embodiment.

Examples of estimation values acquired by the execution of the above-described estimation processing program are illustrated in FIGS. 15A, 15B, 16A, and 16B. FIG. 15A is a graph illustrating time series data of estimation values of the multi feed occurrence rate, and FIG. 15B is a graph illustrating time series data of estimation values of the transport stop fault occurrence rate. Here, in FIGS. 15A and 15B, the vertical axis represents the estimation value, and the horizontal axis represents the time and date when the estimation processing program is executed.

Figure 16A:
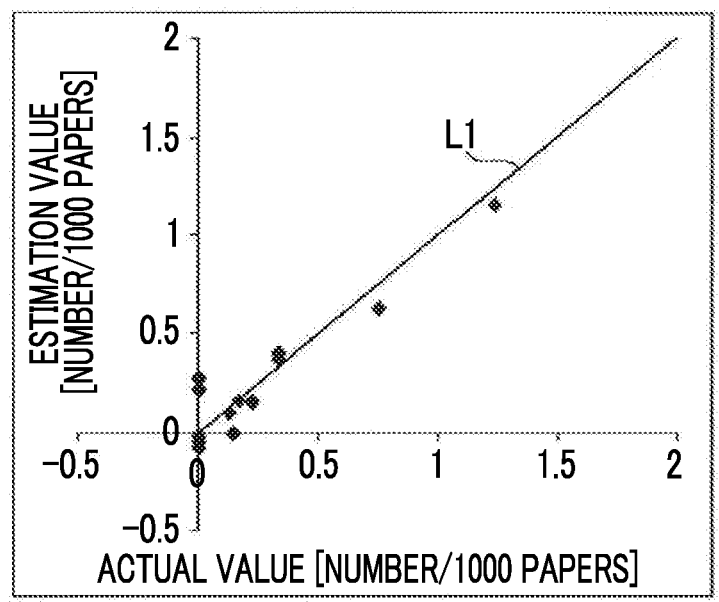
FIG. 16A is a scatter plot illustrating an example of an estimation value and an actual value of the multi feed occurrence rate according to the first exemplary embodiment.
Figure 16B:
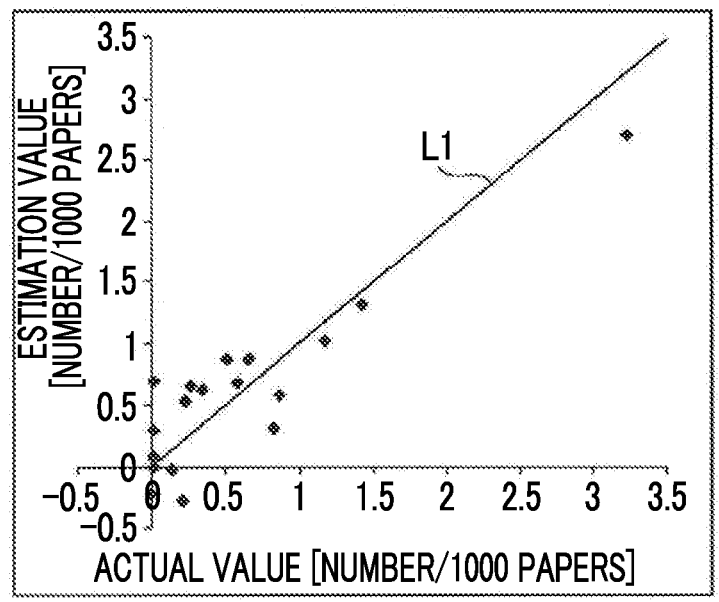
FIG. 16B is a scatter plot illustrating an example of an estimation value and an actual value of the transport stopping fault occurrence rate according to the first exemplary embodiment.

On the other hand, FIG. 16A is a scatter plot illustrating the relationship between an estimation value and an actual value of the multi feed occurrence rate, and FIG. 16B is a scatter plot illustrating the relationship between an estimation value and an actual value of the transport stop fault occurrence rate. Here, in FIGS. 16A and 16B, the vertical axis represents the estimation value, and the horizontal axis represents the actual value. In FIGS. 16A and 16B, the accuracy of estimation is high as each estimation value comes close to a straight line L1 passing through the origin (0, 0) and having a slope of 1. Accordingly, both FIGS. 16A and 16B show that the correlation between the estimation value and the actual value is relatively high.

In the present exemplary embodiment, a case where the multiple regression analysis is used as a method used in the construction of the estimation model is described, but the present exemplary embodiment is not limiting. For example, as the method used in the construction of the estimation model, a different machine learning method such as a neural network may be applied. Further, the multiple regression analysis coefficients and the constant terms may be adjusted by the user.

Further, in the present exemplary embodiment, a case where the estimation model that estimates the transport stop fault occurrence rate and the estimation model that estimates the multi feed occurrence rate are constructed at the same timing is described, but the present exemplary embodiment is not limiting. For example, a configuration in which the estimation models are constructed at different timings may be used.

In addition, in the present exemplary embodiment, a case where the notification indicating that the maintenance work is necessary is performed is described, but the present exemplary embodiment is not limiting. For example, as the estimation value increases, information indicating a time close to a current time point as a time when the maintenance work is necessary may be notified. In this case, for example, when the estimation value is smaller than a first threshold value (for example, 0.5), the notification is not performed, and when the estimation value is the first threshold value or greater and smaller than a second threshold value (for example, 1.5) which is greater than the first threshold value, a message indicating that the maintenance work is necessary within two weeks may be displayed on the display 358 as the transport fault occurrence rate display screen. Further, in this case, when the estimation value is the second threshold value or greater, a message indicating that the maintenance work is necessary within one week may be displayed on the display 358 as the transport fault occurrence rate display screen.

Further, in the present exemplary embodiment, a case where the construction is performed without distinguishing between the estimation models for each feature (type) of the paper P is described, but the construction may be performed by distinguishing between the estimation models for each feature of the paper P. In this case, an explanatory variable and an objective variable may be divided for each feature of the paper P, and the estimation models may be respectively constructed using the multiple regression analysis, in a similar way to the above-described exemplary embodiment. Further, the estimation model may be constructed so that the transport fault occurrence rate which is an occurrence rate of any one of the transport stop fault and the multi feed occurs is derived.

Further, in such a case, for example, one transport fault occurrence rate may be derived based on the transport fault occurrence rate derived for each feature of the paper P using the following expression (3).

$$P_t(t_n) = \frac{P_p(t_n) \times PlainPV + P_c(t_n) \times CoatPV}{PlainPV + CoatPV} \quad (3)$$

Figure 17A:
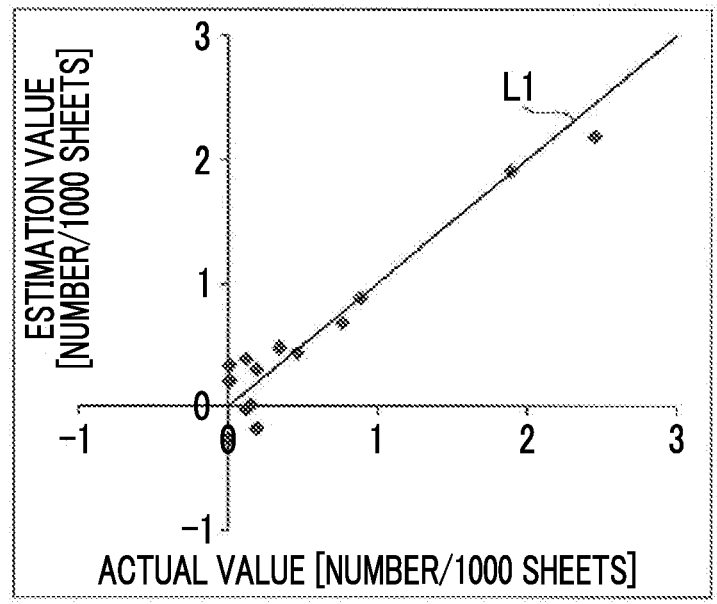
FIG. 17A is a scatter plot illustrating an example of an estimation value and an actual value of a transport fault occurrence rate related to plain paper according to a modification example of the first exemplary embodiment.
Figure 17B:
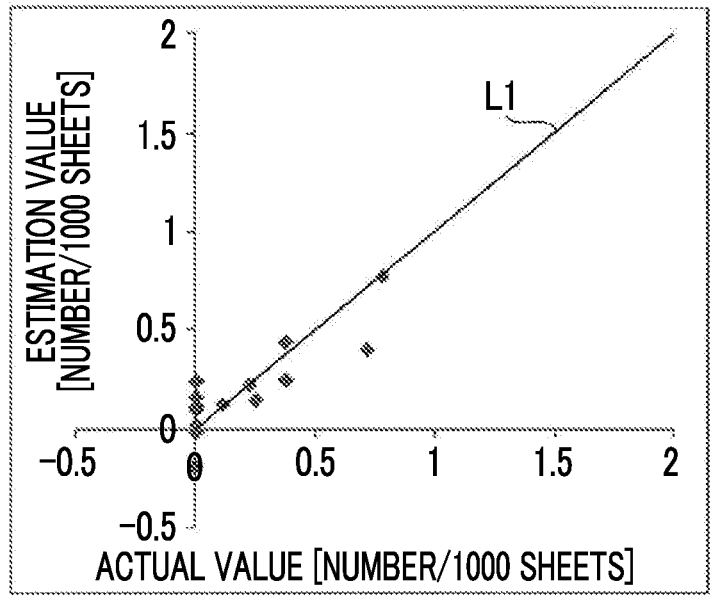
FIG. 17B is a scatter plot illustrating an example of an estimation value and an actual value of a transport fault occurrence rate related to coated paper according to a modification example of the first exemplary embodiment.

$P_t(t_n)$: transport fault occurrence rate at timing $t_n$ $P_p(t_n)$: transport fault occurrence rate of plain paper at timing $t_n$ $P_c(t_n)$: transport fault occurrence rate of coated paper at timing $t_n$ PlainPV: average value of number of outputs of plain paper in estimation target period CoatPV: average value of number of outputs of coated paper in estimation target period FIGS. 17A and 17B illustrates results of an estimation value and an actual value of a transport fault occurrence rate for each feature of the paper P. FIG. 17A is a scatter plot illustrating the relationship of an estimation value and an actual value of a transport fault occurrence rate related to plain paper, and FIG. 17B is a scatter plot illustrating the relationship of an estimation value and an actual value of a transport fault occurrence rate related to coated paper. Similar to FIGS. 16A and 16B, in FIGS. 17A and 17B, the vertical axis represents the estimation value, and the horizontal axis represents the actual value. In FIGS. 17A and 17B, similarly, the accuracy of estimation is high as each estimation value comes close to a straight line L1 passing through the origin (0, 0) and having a slope of 1. Accordingly, similarly, both FIGS. 17A and 17B show that the correlation between the estimation value and the actual value is relatively high.

Second Exemplary Embodiment

In the first exemplary embodiment, a case where the maintenance necessity estimation apparatus 310 estimates the transport fault occurrence rate as the maintenance work necessity is described. On the other hand, in the second exemplary embodiment, a case where the maintenance necessity estimation apparatus 310 estimates the degree of similarity indicating correlation between input information to the estimation model and maintenance work content as the maintenance work necessity will be described. Since a configuration of the maintenance necessity estimation system 300 according to the present exemplary embodiment is the same as that of the maintenance necessity estimation system 300 (see FIGS. 1 to 5) according to the first exemplary embodiment, description thereof will not be repeated.

Figure 18:
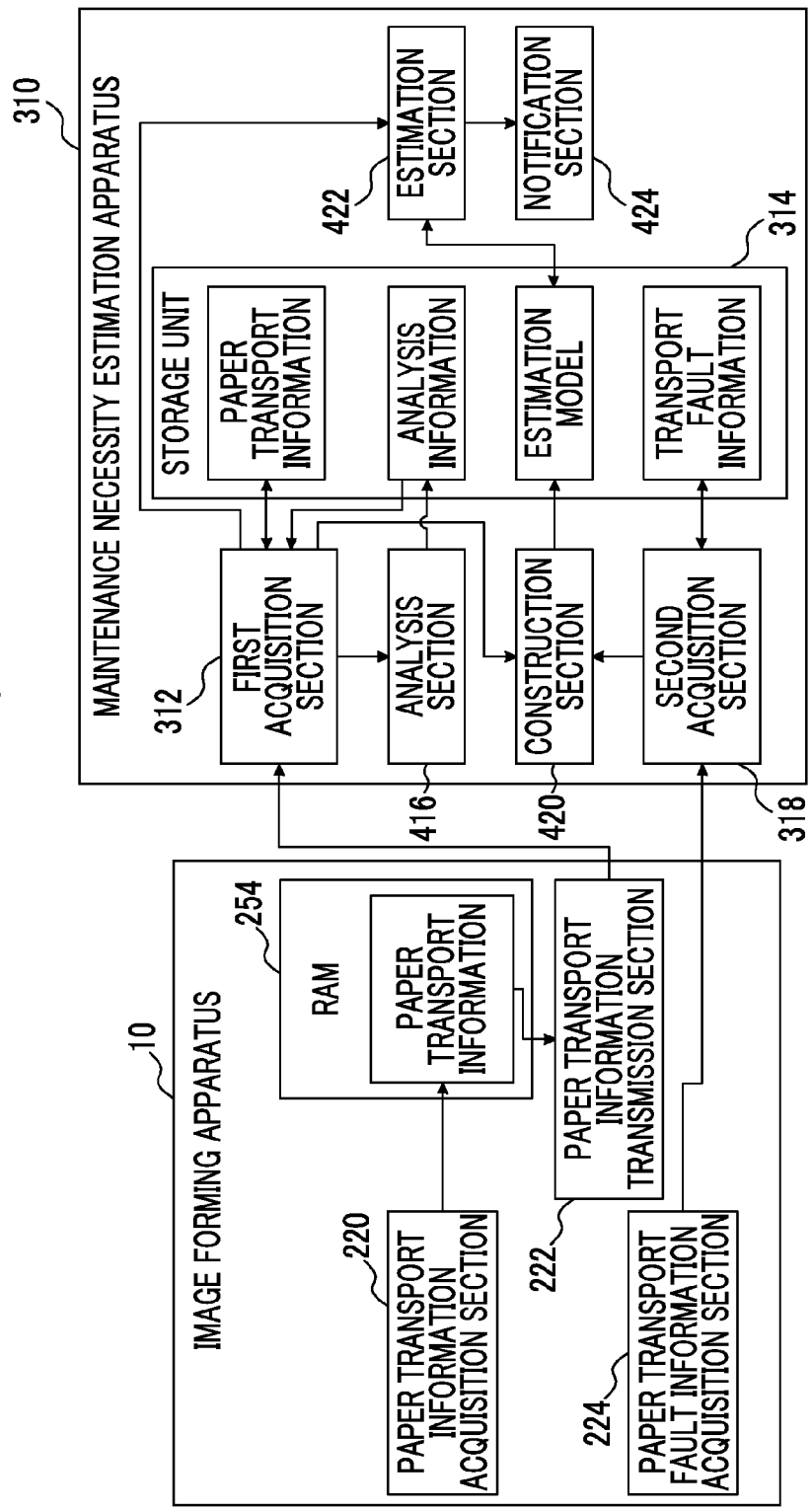
FIG. 18 is a functional block diagram illustrating a functional configuration of an image forming apparatus and a maintenance necessity estimation apparatus according to a second exemplary embodiment.

First, an information transmission function and a maintenance necessity estimation function according to the present exemplary embodiment will be described with reference to FIG. 18. The same reference numerals are given to components in FIG. 18 having the same functions as in FIG. 6, and description thereof will not be repeated.

An exchange work with respect to the driving member is performed due to reduction in a friction coefficient, change in shape or the like associated with long-term abrasion of the driving member. On the other hand, a cleaning work with respect to the driving member is performed due to a short-term state change associated with attachment of paper powder, dust or the like to the paper P when forming the image, for example. For example, in the example shown in FIGS. 9A and 9B, a portion where the first transit time rapidly increases and then decreases (a portion surrounded by a dashed-line ellipse) corresponds to a portion where the cleaning work is performed.

Thus, the analysis section 416 according to the present exemplary embodiment derives the average values and the square roots of the variance values of the first transit times and the second transit times derived in the first exemplary embodiment, and also derives a change rate of the average values and a change rate of the square roots of the variance values, as the transport state feature values. In the analysis section 416 according to the present exemplary embodiment, as the change rate of the average values and the change rate of the square roots of the variance values, second coefficient values of a quadratic approximate curve based on an average values and a square root of a variance value of plural records of the same apparatus ID in analysis information are used, but the present exemplary embodiment is not limiting. For example, as the change rate of the average values and the change rate of the square roots of the variance values, different values indicating the change rate of the average values and the change rate of the square roots of the variance values, such as first order coefficients of a linear approximate line based on the average value and the square root of the variance value of the plural records, may be applied. FIGS. 19A and 19B schematically illustrate an example of analysis information according to the present exemplary embodiment.

The construction section 420 according to the present exemplary embodiment constructs the construction model that estimates necessity information indicating the maintenance work necessity with respect to the driving member for each piece of apparatus type information and for each sensor pair. Specifically, the first acquisition section 312 acquires paper transport information and analysis information from the storage unit 314, and outputs the information to the construction section 420. Further, the second acquisition section 318 acquires transport fault information from the storage unit 314, and outputs the information to the construction section 420. The construction section 420 constructs the estimation model that estimates the necessity information using the paper transport information and the analysis information input by the first acquisition section 312 as input information and using values corresponding to the transport fault information input by the second acquisition section 318 as output information, and stores the estimation model in the storage unit 314.

The estimation section 422 according to the present exemplary embodiment estimates the necessity information using the paper transport information and the analysis information acquired by the first acquisition section 312 from the image forming apparatus 10 which is an estimation target of the necessity information as input information, using the estimation model that is stored in advance in the storage unit 314.

The notification section 424 according to the present exemplary embodiment performs notification corresponding to the necessity information estimated by the estimation section 422.

Figure 20:
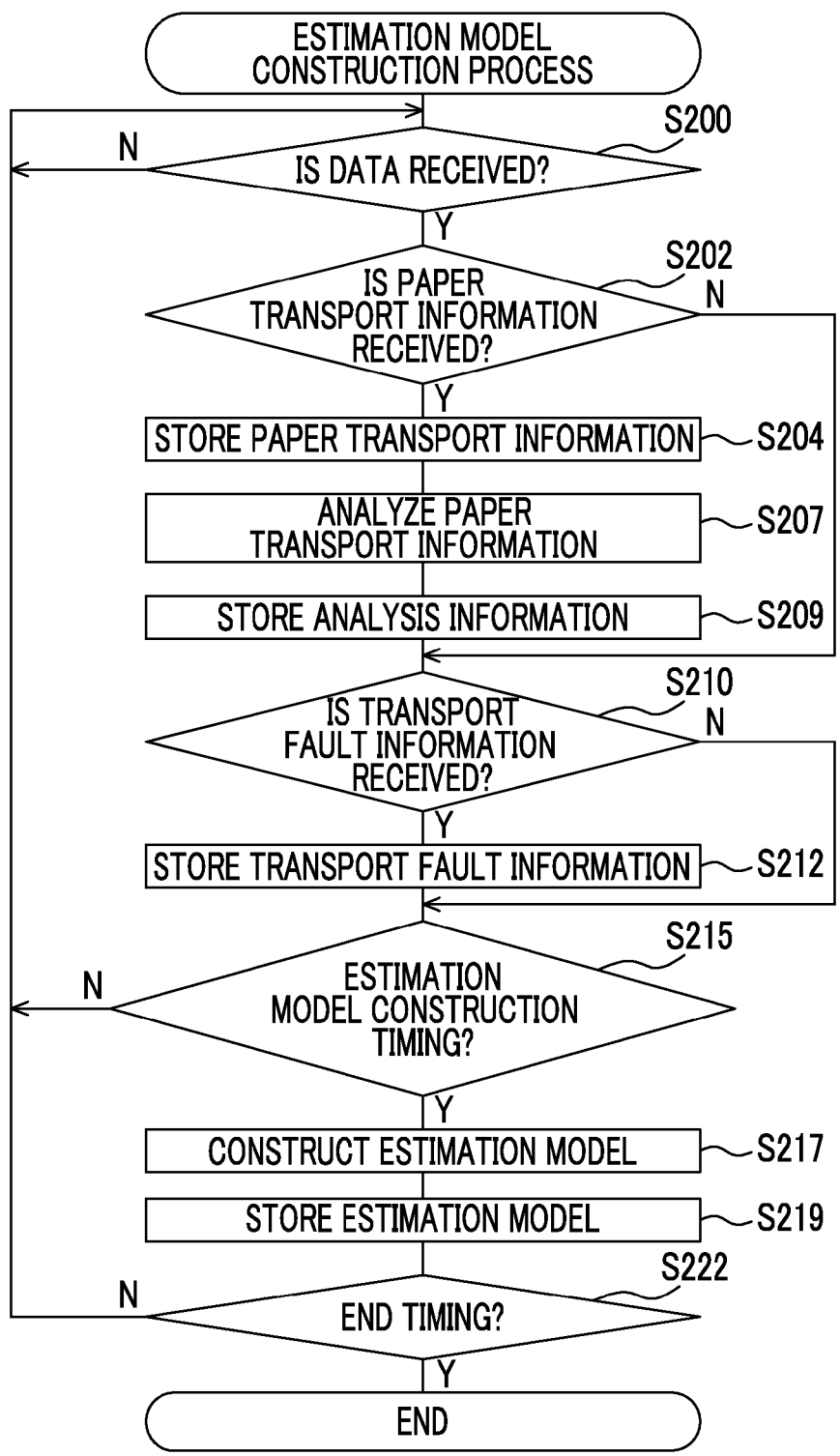
FIG. 20 is a flowchart illustrating the flow of processes in an estimation model construction processing program according to the second exemplary embodiment.
Figure 22:
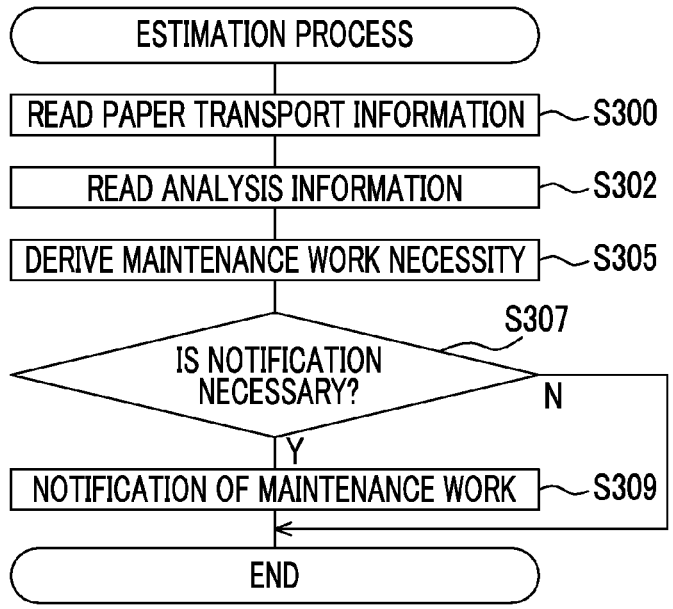
FIG. 22 is a flowchart illustrating the flow of processes of an estimation processing program according to the second exemplary embodiment.

Next, effects of the maintenance necessity estimation apparatus 310 according to the present exemplary embodiment will be described with reference to FIGS. 20 and 22. Since the effects of the image forming apparatus 10 according to the present exemplary embodiment are the same as in the first exemplary embodiment, description thereof will not be repeated. Further, FIG. 20 is a flowchart illustrating the flow of processes of an estimation model construction processing program executed by the CPU 350 of the maintenance necessity estimation apparatus 310 at a timing when power of the maintenance necessity estimation apparatus 310 is in an on state. Further, FIG. 22 is a flowchart illustrating the flow of processes of an estimation processing program executed by the CPU 350 of the maintenance necessity estimation apparatus 310 in each predetermined period (for example, one day). The respective programs are installed in the ROM 352 in advance.

First, the flow of processes of the estimation model construction processing program will be described with reference to FIG. 20. In FIG. 20, the same step numbers as those in FIG. 12 are given to steps where the same processes as those in FIG. 12 are performed, and description thereof will not be repeated.

In step S207 in FIG. 20, as described above, the CPU 350 analyzes the paper transport information received through the process of step S200, and stores, in step S209, the analysis information acquired by analysis of step S207 in the storage unit 314. As schematically illustrated in FIGS. 19A and 19B, the analysis information is stored in the storage unit 314 through the processes of step S207 and step S209.

In step S215, the CPU 350 determines whether a predetermined timing as a timing when the estimation model is constructed occurs. When the determination is affirmative, the CPU 350 proceeds to a process of step S217. When the determination is negative, the CPU 350 returns to the process of step S200. In the present exemplary embodiment, as the timing when the estimation model is constructed, a timing when the paper transport information corresponding to the number of sheets M2 (for example, 5000 sheets) which is determined in advance after the driving member is exchanged is accumulated in the storage unit 314 and the number of records in which the maintenance work content in the transport fault information is exchange and cleaning is a predetermined threshold value (for example 10) or greater is used. The threshold value may be different values or the same value between the exchange and the cleaning.

In step S217, the CPU 350 reads the entirety of the paper transport information, the analysis information and the transport fault information from the storage unit 314, and constructs the estimation model for each apparatus type and for each sensor pair using the paper transport information and the analysis information as input information and using information corresponding to the transport fault information as output information.

Here, the construction of the estimation model will be described in detail. In the present exemplary embodiment, for example, discriminant analysis based on a Mahalanobis distance is used to construct the estimation model. Here, for ease of understanding, in a similar way to the first exemplary embodiment, a case where the estimation model is constructed for the sensor pair of the sensor S1 and the sensor S2 is described, but the estimation model is similarly constructed for a different sensor pair.

In the present exemplary embodiment, as input information (explanatory variables) regarding discriminant analysis, two types of paper feature information (plain paper or coated paper), information corresponding to two types of transit times (the first transit time of the sensor S1, and the second transit time between the sensor S1 and sensor S2) are used. Further, in the present exemplary embodiment, as the input information regarding the discriminant analysis, four types of transport state feature values (an average value and a square root of a variance value of the respective transit times, and a change rate of the average values and a change rate of the square roots of the variance values) with respect to respective pieces of the information corresponding to the two types of transit times are also used. On the other hand, in the present exemplary embodiment, as output information (objective variables), "0" which is a value indicating an initial state group, "1" which is a value indicating a cleaning state group, and "2" which is a value indicating an exchange state group are used.

Here, the initial state group refers to a state group immediately after the image forming apparatus 10 is disposed or a state group immediately after the driving member is exchanged. Further, the cleaning state group refers to a state group in which the cleaning work is necessary, and the exchange state group refers to a state group in which the exchange work is necessary. The values indicating the above-described respective state groups are not limited to the values of the present exemplary embodiment, and may be arbitrary values capable of individually recognizing the respective state groups.

Further, the CPU 350 constructs an estimation model that determines which one of the initial state group, the cleaning state group and the exchange state group input information is classified into (similar to). In the discriminant analysis using the Mahalanobis distance, the Mahalanobis distance is derived by the following expression (4).

$$D(x) = \sqrt{(x-\mu)^T \Sigma^{-1}(x-\mu)} \quad (4)$$

x: vector of input information at prediction timing $(x_1, \ldots, x_{16})$

μ: average vector of input information used to construct estimation model $(\mu_1, \ldots, \mu_{16})$ Σ: covariance matrix D(x): Mahalanobis distance in vector x of input information In the present exemplary embodiment, the CPU 350 derives the above-described average vector μ and the covariance matrix Σ by machine learning for each state group. Specifically, the CPU 350 derives an average vector $\mu_N$ and a covariance matrix $\Sigma_N$ of the initial state group using, as input information, the paper transport information and the analysis information acquired as an image is formed on the sheets of paper P corresponding to the number of sheets M2 from the time when the driving member is exchanged and using "0" as output information. Further, the CPU 350 derives an average vector $\mu_C$ and a covariance matrix $\Sigma_C$ of the cleaning state group using, as input information, the paper transport information and the analysis information corresponding to the number of sheets M2 traced back from the time point when the cleaning work is performed and using "1" as output information. Further, the CPU 350 derives an average vector $\mu_E$ and a covariance matrix $\Sigma_E$ of the exchange state group using, as input information, the paper transport information and the analysis information corresponding to the number of sheets M2 traced back from the time point when the exchange work is performed and using "2" as output information.

Figure 21:
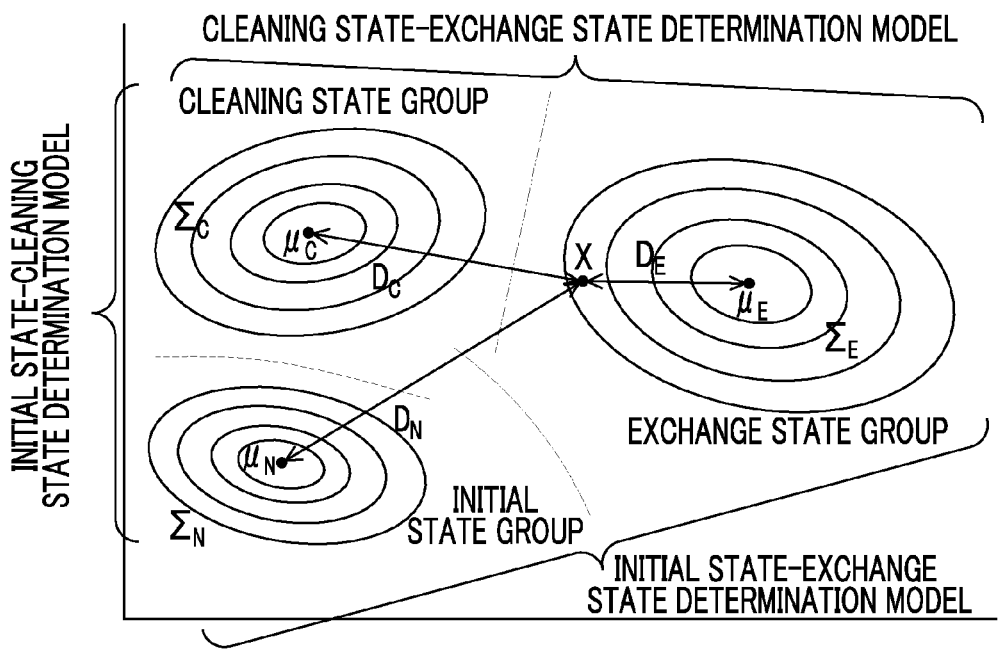
FIG. 21 is a conceptual diagram illustrating the concept of an estimation model according to the second exemplary embodiment.

FIG. 21 is a conceptual diagram illustrating the concept of the estimation model constructed through the process of step S217. A point X in FIG. 21 represents a point corresponding to the vector x of the input information input at a timing when prediction is performed, and a point $\mu_N$ represents a point corresponding to the above-described average vector $\mu_N$. Further, a point $\mu_C$ represents a point corresponding to the above-described average vector $\mu_C$, and a point $\mu_E$ represents a point corresponding to the above-described average vector $\mu_E$. In addition, concentric ellipses $\Sigma_N$, $\Sigma_C$, and $\Sigma_E$ with these points $\mu_N$, $\mu_C$, and $\mu_E$ as the centers correspond to the above-described covariance matrices $\Sigma_N$, $\Sigma_C$, and $\Sigma_E$ one to one.

Further, as shown in FIG. 21, using input information corresponding to the point X and the above-mentioned expression (4), a Mahalanobis distance $D_N$ between the point X and the point $\mu_N$, a Mahalanobis distance $D_C$ between the point X and the point $\mu_C$, and a Mahalanobis distance $D_E$ between the point X and the point $\mu_E$ are respectively derived. In addition, it is determined which one of the initial state group, the cleaning state group and the exchange state group the input information is similar to based on the respectively derived Mahalanobis distances. A dashed line between the initial state group and the cleaning state group, a single dot chain line between the initial state group and the exchange state group, and a double dot chain line between the cleaning state group and the exchange state group, shown in FIG. 21, represent intermediate lines between the respective state groups, respectively.

Specifically, in the present exemplary embodiment, when the Mahalanobis distance is derived and the point X is disposed on each intermediate line, the degrees of similarity between input information corresponding to the point X and the respective state groups corresponding to each intermediate line are respectively set to 0 (zero). Further, in the present exemplary embodiment, when the point X matches the central point $\mu_N$, $\mu_C$, or $\mu_E$ of each state group, the degree of similarity between the input information corresponding to the point X and each state group corresponding to the central point $\mu_N$, $\mu_C$, or $\mu_E$ is set to 100. Furthermore, in the present exemplary embodiment, as the point X comes close to the central point $\mu_N$, $\mu_C$, or $\mu_E$ from each central line, the degree of similarity increases. Further, for example, when it is determined that the input information is similar to the initial state group, it is estimated that the maintenance work is not necessary, when it is determined that the input information is similar to the cleaning state group, it is estimated that the cleaning work is necessary, and when it is determined that the input information is similar to the exchange state group, it is estimated the exchange work is necessary.

In step S219, the CPU 350 stores the average vector μ and the covariance matrix Σ derived through the process of step S217 in the storage unit 314, to thereby store (update) the estimation model.

Next, the flow of processes of an estimation processing program that estimates a maintenance work necessity using the estimation model constructed by the estimation model construction processing program will be described with reference to FIG. 22. In FIG. 22, the same step numbers as those in FIG. 13 are given to steps where the same processes as those in FIG. 13 are performed, and description thereof will not be repeated.

In step S305 in FIG. 22, the CPU 350 derives the maintenance work necessity using respective pieces of information read through the process of step S300 and respective pieces of information read through the process of step S302 as input information, using the estimation model stored in the storage unit 314. Specifically, as described above, the CPU 350 derives the Mahalanobis distances between the input information and the respective state groups for each apparatus and for each sensor pair using the expression (4), respectively, and derives the degrees of similarity between the input information corresponding to the Mahalanobis distances and the respective state groups.

In step S307, the CPU 350 determines whether to notify that the maintenance work is necessary based on the degrees of similarity between the input information and the respective state groups derived through the process of step S305. When the determination is affirmative, the CPU 350 proceeds to a process of step S309. In the present exemplary embodiment, for example, when a state group having the largest degree of similarity to the input information is the cleaning state group or the exchange state group, and when the degree of similarity is a predetermined threshold value (in the present exemplary embodiment, for example, 50) or greater, the CPU 350 determines to notify that the maintenance work is necessary. Further, the threshold value used in the process of step S307 may be set according to promptness of a required maintenance work, or may be set by input of a user through the keyboard 356 or the like.

Figure 23:
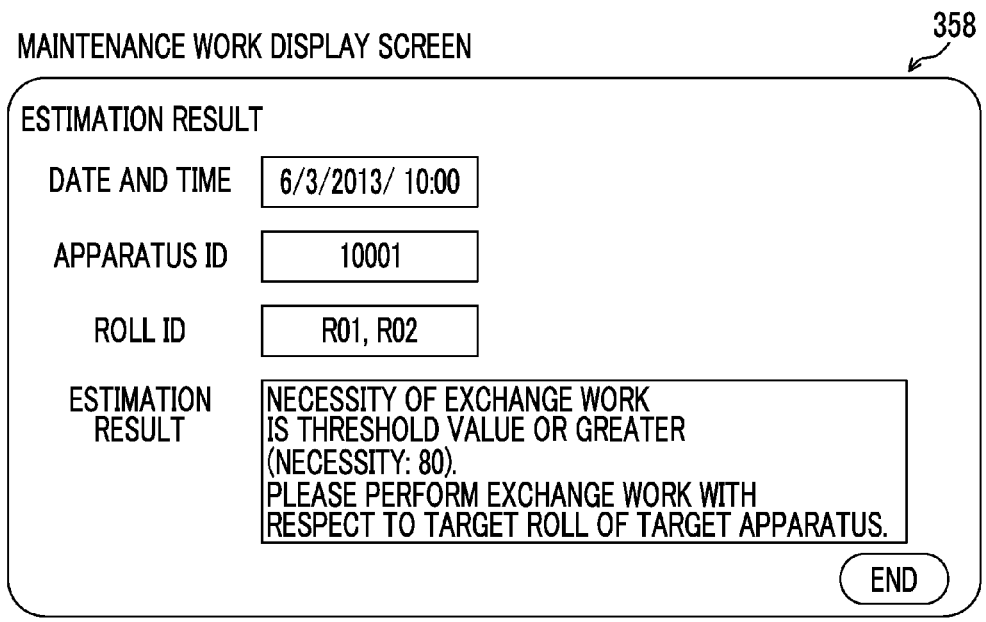
FIG. 23 is a schematic diagram illustrating an example of a maintenance work display screen according to the second exemplary embodiment.
Figure 25A:
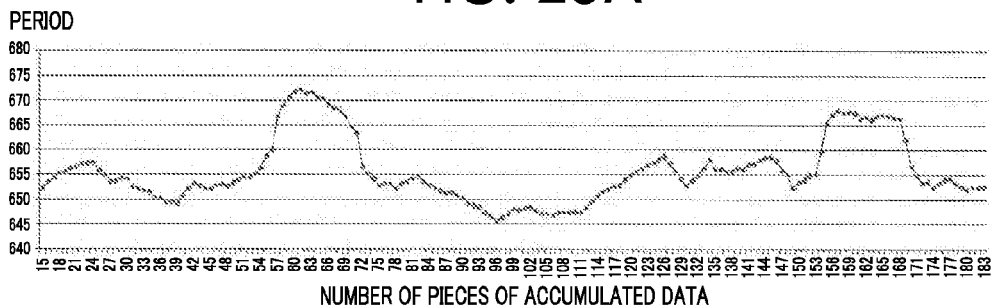
FIG. 25A is a graph illustrating an example of a change of a moving average of a first transit time when plain paper is transported according to a modification example of each exemplary embodiment.
Figure 25B:
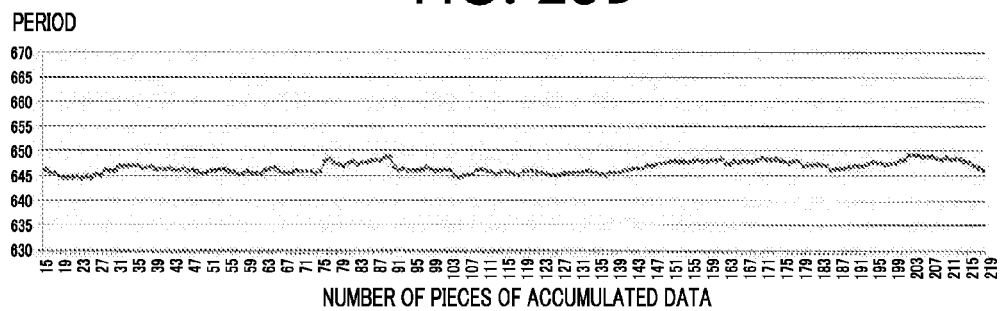
FIG. 25B is a graph illustrating an example of a change of a moving average of a first transit time when coated paper is transported according to a modification example of each exemplary embodiment.
Figure 25C:
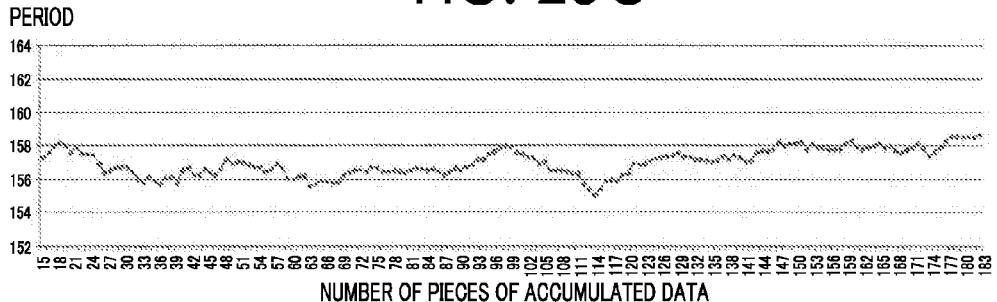
FIG. 25C is a graph illustrating an example of a change of a moving average of a second transit time between timing sensors when plain paper is transported according to a modification example of each exemplary embodiment.
Figure 25D:
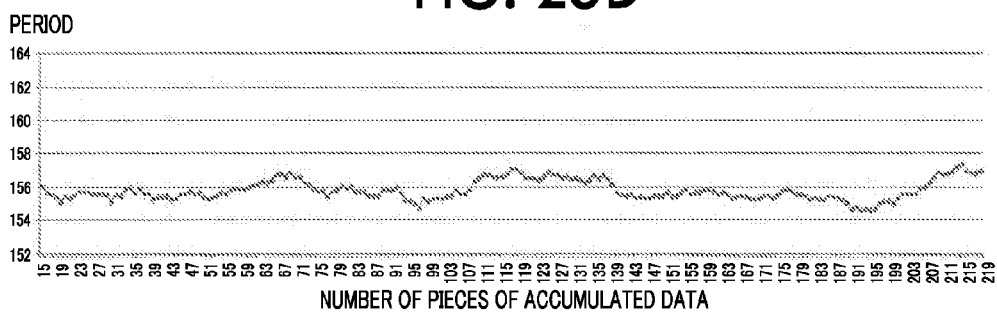
FIG. 25D is a graph illustrating an example of a change of a moving average of a second transit time between the timing sensors when coated paper is transported according to a modification example of each exemplary embodiment.
Figure 26A:
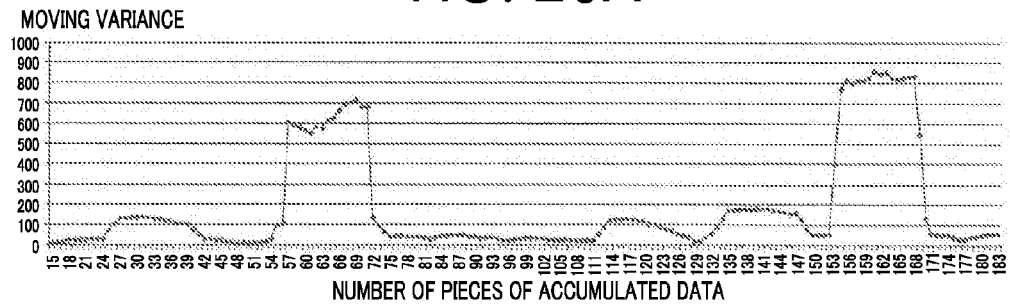
FIG. 26A is a graph illustrating an example of a change of moving variance of the first transit times when the plain paper is transported according to the modification example of each exemplary embodiment.
Figure 26B:
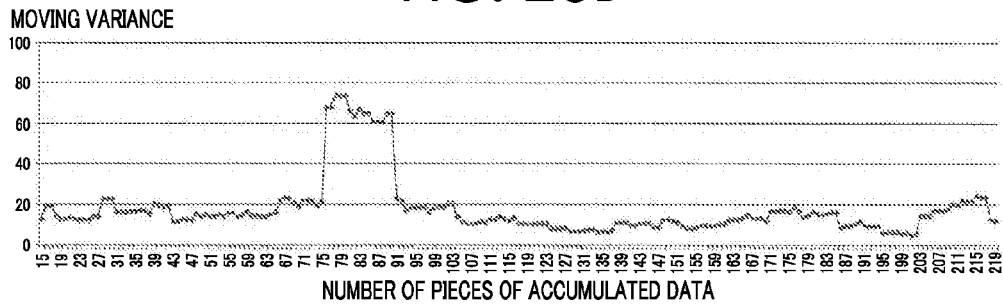
FIG. 26B is a graph illustrating an example of a change of moving variance of the first transit times when the coated paper is transported according to the modification example of each exemplary embodiment.
Figure 26C:
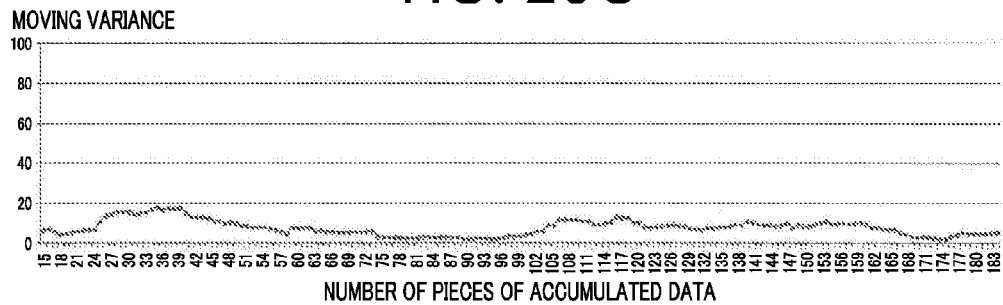
FIG. 26C is a graph illustrating an example of a change of moving variance of the second transit times between the timing sensors when the plain paper is transported according to the modification example of each exemplary embodiment.
Figure 26D:
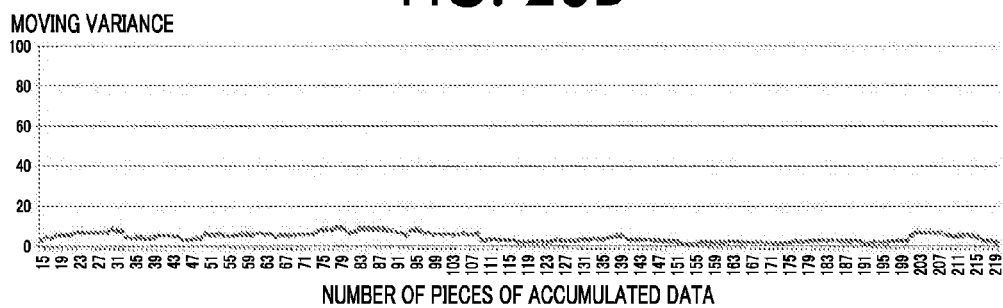
FIG. 26D is a graph illustrating an example of a change of moving variance of the second transit times between the timing sensors when the coated paper is transported according to the modification example of each exemplary embodiment.

In step S309, the CPU 350 displays a maintenance work display screen that notifies the maintenance work corresponding to the state group having the largest degree of similarity derived through the process of step S305 on the display 358. FIG. 23 illustrates an example of the maintenance work display screen according to the present exemplary embodiment. As shown in FIG. 23, date and time when the notification is performed, an apparatus ID of the image forming apparatus 10 which is a notification target, and a roll ID of a roll which is a maintenance work target are shown on the maintenance work display screen according to the present exemplary embodiment. Further, as shown in FIG. 23, on the maintenance work display screen according to the present exemplary embodiment, an estimation result is also shown using a prepared character string, the content of the maintenance work corresponding to the state group having the largest degree of similarity derived in the process of step S305, and the degree of similarity. When the display of the maintenance work display screen is terminated, the user designates an end button displayed in a lower part of the maintenance work display screen by the keyboard 356 or the like.

On the other hand, when the determination is negative in step S307, the CPU 350 terminates the estimation processing program without executing the process of step S309.

In the present exemplary embodiment, a case where it is determined whether to notify that the maintenance work is necessary based on the degree of similarity corresponding to the Mahalanobis distance derived using the estimation model is described, but the present exemplary embodiment is not limiting. For example, values derived using the estimation model may be different in accordance with the content of the maintenance work, and it may be determined whether to notify that the maintenance work is necessary based on the derived values. In this case, for example, the values derived using the estimation model are set to "0", "1", and "2", and the estimation model is constructed so that, when "0" is derived, the input information is classified as the initial state group, and when "1" is derived, the input information is classified as the cleaning state group, and "2" is derived, the input information is classified as the exchange state group. Further, when the value derived using the estimation model is "1", it may be notified that the cleaning work is necessary, and when the value is "2", it may be notified that the exchange work is necessary.

Further, in these examples and the present exemplary embodiments, as the degree of similarity between the input information and the state group of the maintenance work corresponding to the derived value has a larger value, information indicating a time closer to a current time may be notified as a time when the maintenance work is necessary.

Further, in the present exemplary embodiment, a case where the discriminant analysis based on the Mahalanobis distance is used as a method used in the construction of the estimation model is described, but the present exemplary embodiment is not limiting. For example, as the method used in the construction of the estimation model, a different machine learning method such as a decision tree, multiple regression analysis, neural network, Bayesian network, or naive Bayes algorithm may be applied.

Further, in the present exemplary embodiment, a case where the Mahalanobis distance is applied as the value used to derive the degree of similarity between the input information and each state group is described, but the present exemplary embodiment is not limiting. For example, as the value used to derive the degree of similarity, a different value such as an Euclidean distance may be applied.

Hereinbefore, the exemplary embodiments are described, but the technical scope of the invention is not limited to the scope disclosed in the exemplary embodiments. Various changes or modifications may be added to the exemplary embodiments in a range without departing from the concept of the invention, and configurations with the added changes or modifications are also included in the technical scope of the invention.

Further, the exemplary embodiments do not limit the invention disclosed in claims, and all of the combinations of features described in the exemplary embodiments are not essential as solving means of the invention. Various aspects of the invention are included in the exemplary embodiments, and thus, various aspects of the invention may be derived by combination of the disclosed plural components. Even though some of all the components disclosed in the exemplary embodiments are not provided, a configuration in which some components are not provided may be derived as an aspect of the invention as long as the effects are obtained by the configuration.

For example, the number of pieces of input information shown in the above-described respective exemplary embodiments is not limited to the number shown in the exemplary embodiments, and may be appropriately changed in accordance with required estimation accuracy, processing performance of the maintenance necessity estimation system 300, or the like. In this case, for example, a weight of the paper P and the size of the paper P, in addition to the type of the paper P, may be applied as the features of the paper P. FIG. 24 schematically illustrates an example of paper transport information in this case. Further, for example, embossed paper may be added as the type of the paper P.

Further, in the respective exemplary embodiments, a case where the average value and the square root of the variance value are applied as the statistics indicating the features of the transport state of the paper P is described, but the exemplary embodiments are not limiting. For example, a moving average and a moving variance may be applied as the statistics. FIGS. 25A to 25D and FIGS. 26A to 26D shows time series changes of moving averages and moving variances in this case. In FIGS. 25A to 25D and FIGS. 26A and 26D, the vertical axis represents a statistic value, the horizontal axis represents the number of pieces of accumulated data acquired by the first acquisition section 312, in which data shown on the right side corresponds to data acquired later. Further, for example, instead of the square root of the variance value, the variance value may be applied as the statistic. In this case, in the second exemplary embodiment, a change rate of the variance value, instead of the change rate of the square root of the variance value, may be applied as the statistic.

Further, in the respective exemplary embodiments, a case where the analysis is performed by the analysis section 316 (analysis section 416) whenever the paper transport information is acquired by the first acquisition section 312 is described, but the exemplary embodiments are not limiting. For example, the analysis may be performed by the analysis section 316 (analysis section 416) in each predetermined period (for example, one day).

Further, in the first exemplary embodiment, a case where the transport fault occurrence rate is estimated is described, but the first exemplary embodiment is not limiting. For example, when the occurrence rate is smaller than the first threshold value, the maintenance work necessity is classified as "small", when the occurrence rate is the first threshold value or greater and smaller than the second threshold value, the maintenance work necessity is classified as "middle", and when the occurrence rate is the second threshold value or greater, the maintenance work necessity is classified as "large". Further, the estimation model may estimate which one of "large", "middle", and "small" the input information is classified as. Further, in this case, as a method for constructing the estimation model, the same method as that of the second exemplary embodiment may be applied.

Further, in the respective exemplary embodiments, a case where the paper transport information is stored in the storage unit 314 of the maintenance necessity estimation apparatus 310 and the paper transport information is analyzed by the maintenance necessity estimation apparatus 310 is described, but the exemplary embodiments are not limiting. For example, the processes may be performed by each image forming apparatus 10.

Further, the number or positions of the timing sensors 57 shown in the respective exemplary embodiments are not limited to the number or positions shown in the exemplary embodiments, and may be appropriately changed according to required estimation accuracy or the like.

Further, in the respective exemplary embodiments, a case where the time point when the paper feeding from the paper container 48 is started is applied as a starting point of detection of the first transit time is described, but the exemplary embodiments are not limiting. For example, a different predetermined time point such as a time point when an image forming instruction is input from an external device to the CPU 250 or a time point when a transport starting instruction of the paper P is output from the CPU 250 may be applied as the starting point of detection of the first transit time.

Further, in the respective exemplary embodiments, a case where the estimation model is constructed in each type of the image forming apparatus is described, but the exemplary embodiments are not limiting. For example, the estimation model may be constructed using a different apparatus type. In this case, for example, it is necessary to standardize input information of the different apparatus type used in the construction of the estimation model, for example, to set the arrangement positions of the timing sensors 57 to the same positions.

Further, in the respective exemplary embodiments, a case where the image forming apparatus is applied as the maintenance necessity estimation target is described, but the exemplary embodiments are not limiting. For example, as the maintenance necessity estimation target, a different apparatus having a driving member operated to transport sheets of paper in an image reading device or the like may be applied.

In addition, the configurations (see FIGS. 1 to 6, and FIG. 18) of the maintenance necessity estimation system 300, the image forming apparatus 10, and the maintenance necessity estimation apparatus 310 are exemplary, and thus, an unnecessary part thereof may not be provided or a new part may be added thereto in a range without departing from the concept of the invention.

Further, the flows (see FIGS. 11 to 13, FIG. 20, and FIG. 22) of the processes of the various programs described in the respective exemplary embodiments are exemplary, and thus, an unnecessary step may not be provided, a new step may be added thereto, or the processing orders thereof may be changed in a range without departing from the concept of the invention.

The configurations (see FIGS. 14 and 23) of the respective display screens in the respective exemplary embodiments are exemplary, and thus, some of the information may be deleted, new information may be added, or the display positions thereof may be changed in a range without departing from the concept of the invention.

Furthermore, the configurations (FIGS. 7, 8, 10, 19, and 24) of the respective pieces of information in the respective exemplary embodiments are also exemplary, and thus, some of the information may be deleted, new information may be added, or the storage positions thereof may be changed in a range without departing from the concept of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A maintenance necessity estimation apparatus comprising:
    a storage unit that stores in advance an estimation model that is constructed in advance using a value corresponding to a first transit time from a predetermined time point in each image processing apparatus that includes a transport path on which paper is transported and a drive member that is disposed along the transport path and is operated to transport the paper to a time point when the paper passes through a predetermined position on the transport path, and using first feature information indicating a feature of the paper, as input information, which are acquired from the plurality of image processing apparatuses, and using, as output information, information corresponding to transport fault information relating to a transport fault of the paper due to the drive member, which is acquired from the plurality of image processing apparatuses, and estimates first necessity information indicating a degree of necessity of a maintenance work with respect to the drive member in accordance with the output information;
    an acquisition section that acquires a second transit time and second feature information of an image processing apparatus which is an estimation target of second necessity information; and
    an estimation section that estimates necessity information of the image processing apparatus which is the estimation target using, as input information, a value corresponding to the second transit time and the second feature information acquired by the acquisition unit, using the estimation model stored in the storage unit.

2. The maintenance necessity estimation apparatus according to claim 1, wherein
    each of the first and second feature information is information including at least a type corresponding to a feature of a front surface of the paper.

3. The maintenance necessity estimation apparatus according claim 2, wherein
    the storage unit stores in advance the plurality of estimation models that are constructed in advance in each type of the image forming apparatus.

4. The maintenance necessity estimation apparatus according to claim 3, wherein the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses, the acquisition section acquires the second transit time and the second feature information at the plurality of positions, and the estimation section respectively estimates the first and second necessity information using, as the respective pieces of input information, the value corresponding to the second transit time every two positions and the feature information which are acquired by the acquisition section, using the plurality of estimation models stored by the storage unit every two positions.

5. The maintenance necessity estimation apparatus according to claim 2, wherein the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses, the acquisition section acquires the second transit time and the second feature information at the plurality of positions, and the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

6. The maintenance necessity estimation apparatus according to claim 1, wherein the output information and the first and second necessity information are the frequency of the occurrence of the transport fault in the paper.

7. The maintenance necessity estimation apparatus according to claim 6, wherein the storage unit stores in advance the plurality of estimation models that are constructed in advance in each type of the image forming apparatus.

8. The maintenance necessity estimation apparatus according to claim 7, wherein the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses, the acquisition section acquires the second transit time and the second feature information at the plurality of positions, and the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

9. The maintenance necessity estimation apparatus according to claim 6, wherein the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses, the acquisition section acquires the second transit time and the second feature information at the plurality of positions, and the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

10. The maintenance necessity estimation apparatus according to claim 1, wherein the transport fault information includes maintenance work information indicating content of the maintenance work with respect to the driving member, the output information is a value for identifying the content of the maintenance work, and each of the first and second necessity information is similarity degree information indicating a degree of similarity between the input information and the content of the maintenance work.

11. The maintenance necessity estimation apparatus according to claim 10, wherein the maintenance work includes a cleaning work with respect to the drive member, and the value corresponding to each of the first and second transit time includes a change rate of an average value of the first and second transit times and a change rate of a variance value of the first and second transit times within a predetermined period.

12. The maintenance necessity estimation apparatus according to claim 11, wherein the storage unit stores in advance the plurality of estimation models that are constructed in advance in each type of the image forming apparatus.

13. The maintenance necessity estimation apparatus according to claim 11, wherein the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses, the acquisition section acquires the second transit time and the second feature information at the plurality of positions, and the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

14. The maintenance necessity estimation apparatus according to claim 10, wherein
the storage unit stores in advance the plurality of estimation models that are constructed in advance in each type of the image forming apparatus.

15. The maintenance necessity estimation apparatus according to claim 10, wherein
the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses,
the acquisition section acquires the second transit time and the second feature information at the plurality of positions, and
the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

16. The maintenance necessity estimation apparatus according to claim 1, wherein
the storage unit stores in advance the plurality of estimation models that are constructed in advance in each type of the image forming apparatus.

17. The maintenance necessity estimation apparatus according to claim 16, wherein
the storage unit stores in advance the plurality of estimation models that are constructed in advance using, as the respective pieces of input information, the value corresponding to the first transit time every two positions adjacently disposed along the transport path and the feature information, which are acquired with respect to a plurality of predetermined positions of the transport path with the driving member being disposed therebetween in the plurality of image forming apparatuses,
the acquisition section acquires the second transit time and the second feature information at the plurality of positions, and
the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

18. The maintenance necessity estimation apparatus according to claim 1, wherein
the storage unit stores in advance the plurality of estimation models that are constructed in advance using, as the respective pieces of input information, the value corresponding to the first transit time every two positions adjacently disposed along the transport path and the first feature information, which are acquired with respect to a plurality of predetermined positions of the transport path with the driving member being disposed therebetween in the plurality of image forming apparatuses,
the acquisition section acquires the second transit time and the second feature information at the plurality of positions, and
the estimation section respectively estimates the first and second necessity information using, as the respective pieces of input information, the value corresponding to the second transit time every two positions and the second feature information which are acquired by the acquisition section, using the plurality of estimation models stored by the storage unit every two positions.

19. The maintenance necessity estimation apparatus according to claim 1, further comprising:
a notification section that notifies information indicating a time closer to a current time as a time when the maintenance work is necessary as the degree of necessity of the maintenance work indicated by the second necessity information estimated by the estimation section is greater.

20. A non-transitory computer readable medium storing a program causing a computer to function as:
the acquisition section and the estimation section of the maintenance necessity estimation apparatus according to claim 1.

* * * * *